US012763469B2

(12) United States Patent
Sako

(10) Patent No.: US 12,763,469 B2
(45) Date of Patent: Oct. 13, 2026

(54) ANTENNA DEVICE

(71) Applicant: Murata Manufacturing Co., Ltd., Nagaokakyo (JP)

(72) Inventor: Yoshihiro Sako, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 542 days.

(21) Appl. No.: 18/318,263

(22) Filed: May 16, 2023

(65) Prior Publication Data

US 2023/0291106 A1 Sep. 14, 2023

Related U.S. Application Data

(63) Continuation of application No. PCT/JP2021/033566, filed on Sep. 13, 2021.

(30) Foreign Application Priority Data

Nov. 20, 2020 (JP) ................................ 2020-193130

(51) Int. Cl.
*H01Q 7/08* (2006.01)

(52) U.S. Cl.
CPC .................................... *H01Q 7/08* (2013.01)

(58) Field of Classification Search
CPC .................................. H01Q 7/08; H01Q 7/06
See application file for complete search history.

(56) References Cited

U.S. PATENT DOCUMENTS

2020/0036096 A1 1/2020 Kurokawa

FOREIGN PATENT DOCUMENTS

| | | | | | |
|---|---|---|---|---|---|
| EP | 2093833 | A1 | * | 8/2009 | ............... H01Q 7/08 |
| JP | 2002245416 | A | * | 8/2002 | |
| JP | 2002261534 | A | * | 9/2002 | |
| JP | 2014154896 | A | | 8/2014 | |
| JP | 2016171099 | A | | 9/2016 | |
| JP | 2017200149 | A | | 11/2017 | |
| JP | 2018183028 | A | | 11/2018 | |
| WO | 2017119215 | A1 | | 7/2017 | |

OTHER PUBLICATIONS

International Search Report in PCT/JP2021/033566, mailed Nov. 22, 2021, 3 pages.

* cited by examiner

*Primary Examiner* — Dieu Hien T Duong
(74) *Attorney, Agent, or Firm* — ArentFox Schiff LLP

(57) ABSTRACT

An antenna device is provided that includes an antenna circuit and a resistance circuit. The antenna circuit has a first inductor. The resistance circuit has a second inductor and is electrically connected to the antenna circuit. The first inductor has a first winding and a core arranged inside the first winding. The second inductor has a second winding that comprises an air-core coil.

18 Claims, 24 Drawing Sheets

1A

1B

ANTENNA DEVICE

CROSS REFERENCE TO RELATED APPLICATIONS

This application is a continuation of PCT Application No. PCT/JP2021/033566, filed Sep. 13, 2021, which claims priority to Japanese Patent Application No. 2020-193130, filed Nov. 20, 2020, the entire contents of each of which are hereby incorporated by reference in their entirety.

TECHNICAL FIELD

The present disclosure relates generally to antenna devices. More specifically, the present disclosure relates to an antenna device including an inductor (coil).

BACKGROUND

Japanese Unexamined Patent Application Publication No. 2017-200149 (hereinafter "Patent Document 1") discloses an antenna device that includes a core, a bobbin body, a coil, a connection terminal, a copper tape winding portion, and a case as main components. A diameter of a conducting wire constituting the coil is reduced so as to have at least a part of a resistance value of a resistance element as compared with a configuration in which the resistance element is connected in series to a series resonant circuit including a core.

In Patent Document 1, in order to obtain a similar effect to that of the configuration in which the resistance element is connected in series to the series resonant circuit, the diameter of the conducting wire constituting the coil is adjusted. However, it is difficult in practice to obtain a desired resistance value by adjusting the diameter of the conducting wire. Furthermore, a change in the specification of the conducting wire constituting the coil may affect the inductance of the antenna device.

SUMMARY OF THE INVENTION

Accordingly, the present disclosure provides an antenna device configured to easily adjust a resistance value of the antenna device while reducing an influence on inductance of the antenna device.

In an exemplary aspect, the present disclosure relates to an antenna device that includes an antenna circuit and a resistance circuit. The antenna circuit has a first inductor and the resistance circuit has a second inductor and is electrically connected to the antenna circuit. The first inductor has a first winding and a core arranged inside the first winding. The second inductor has a second winding comprising an air-core coil.

Moreover, in another exemplary aspect, the present disclosure relates to an antenna device that includes an antenna circuit and a resistance circuit. The antenna circuit has a first inductor and the resistance circuit has a second inductor and is electrically connected to the antenna circuit. The first inductor has a first winding and a first core arranged inside the first winding. The second inductor has a second winding and a second core arranged inside the second winding. The second winding has at least one set of a first winding portion and a second winding portion. The winding direction of the first winding portion and the winding direction of the second winding portion are opposite to each other.

According to the exemplary aspects of the present disclosure, the resistance value of the antenna device can be easily adjusted while reducing the influence on the inductance of the antenna device.

DETAILED DESCRIPTION OF EMBODIMENTS

Hereinafter, embodiments will be described in detail with reference to the drawings as appropriate. However, an unnecessarily detailed description may be omitted. For example, a detailed description of a well-known matter or a repeated description of substantially the same configuration may be omitted. This is to prevent the following descriptions from being unnecessarily redundant and to facilitate understanding by those skilled in the art. Note that the inventor(s) provides the accompanying drawings and the following description in order for those skilled in the art to sufficiently understand the present disclosure and does not intend to limit the subject matter described in the claims by the accompanying drawings and the following descriptions.

EXEMPLARY EMBODIMENTS

1. Embodiment 1

1-1. Overview

Figure 1:
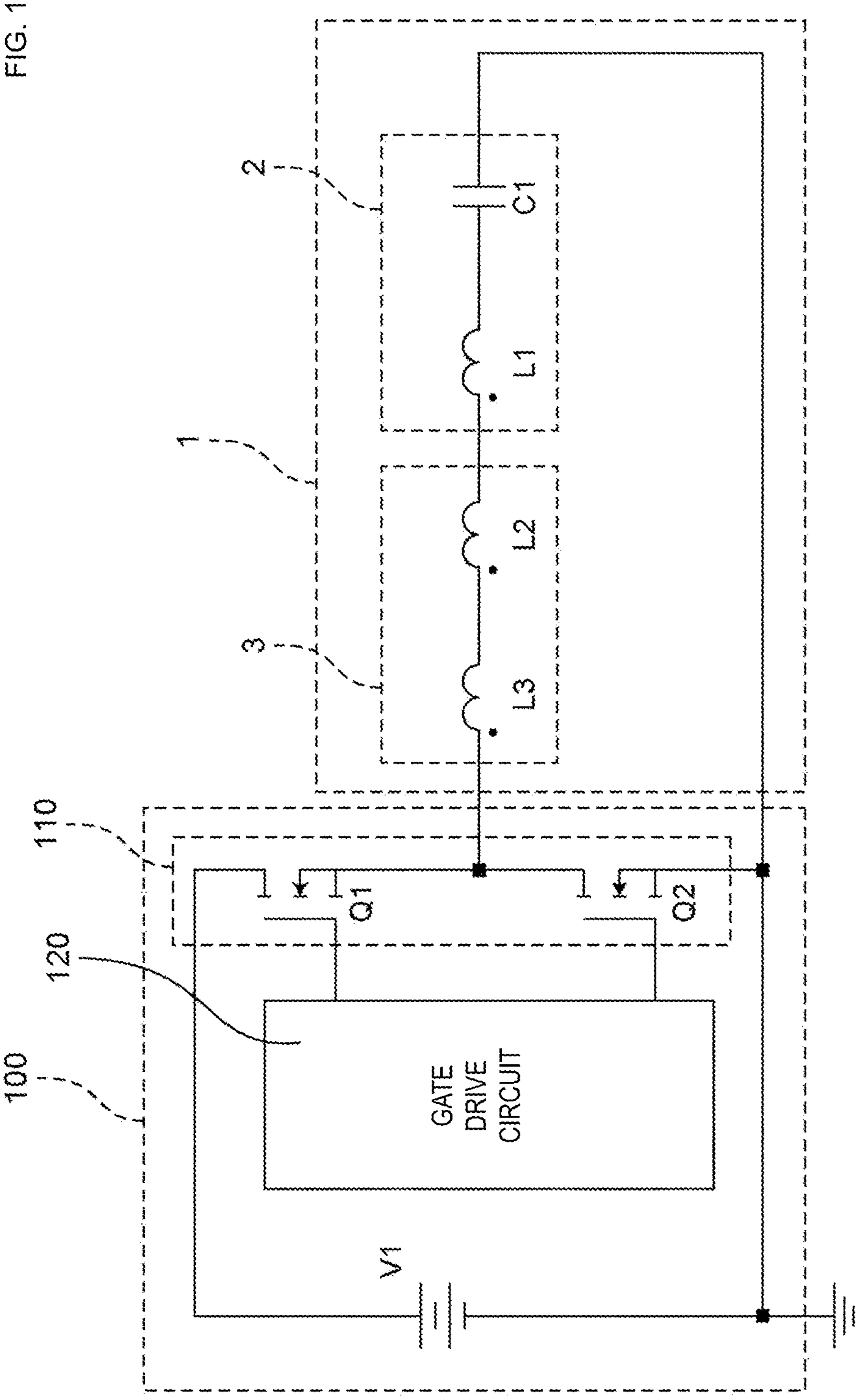
FIG. 1 is a circuit diagram illustrating a configuration example of a system including an antenna device according to exemplary Embodiment 1.

FIG. 1 is a circuit diagram illustrating a configuration example of a system including an antenna device 1 according to the present embodiment. As shown, the system of FIG. 1 includes an antenna device 1 and an antenna drive circuit 100 that drives the antenna device 1.

In this aspect, the antenna drive circuit 100 includes a DC power supply V1, a switching circuit 110, and a gate drive circuit 120. The switching circuit 110 includes a series circuit of two switching elements Q1 and Q2. The switching circuit 110 is electrically connected between both ends of the DC power supply V1. In operation, the gate drive circuit 120 alternately outputs signals to the gates of the switching elements Q1 and Q2 of the switching circuit 110, thereby switching the DC voltage from the DC power supply V1 and outputting a high-frequency voltage from the switching circuit 110.

The antenna device 1 includes an antenna circuit 2 and a resistance circuit 3. The resistance circuit 3 is electrically connected to the antenna circuit 2. The antenna device 1 is connected to the antenna drive circuit 100 so as to be electrically connected in parallel to the switching element Q2 of the switching circuit 110.

Figure 2:
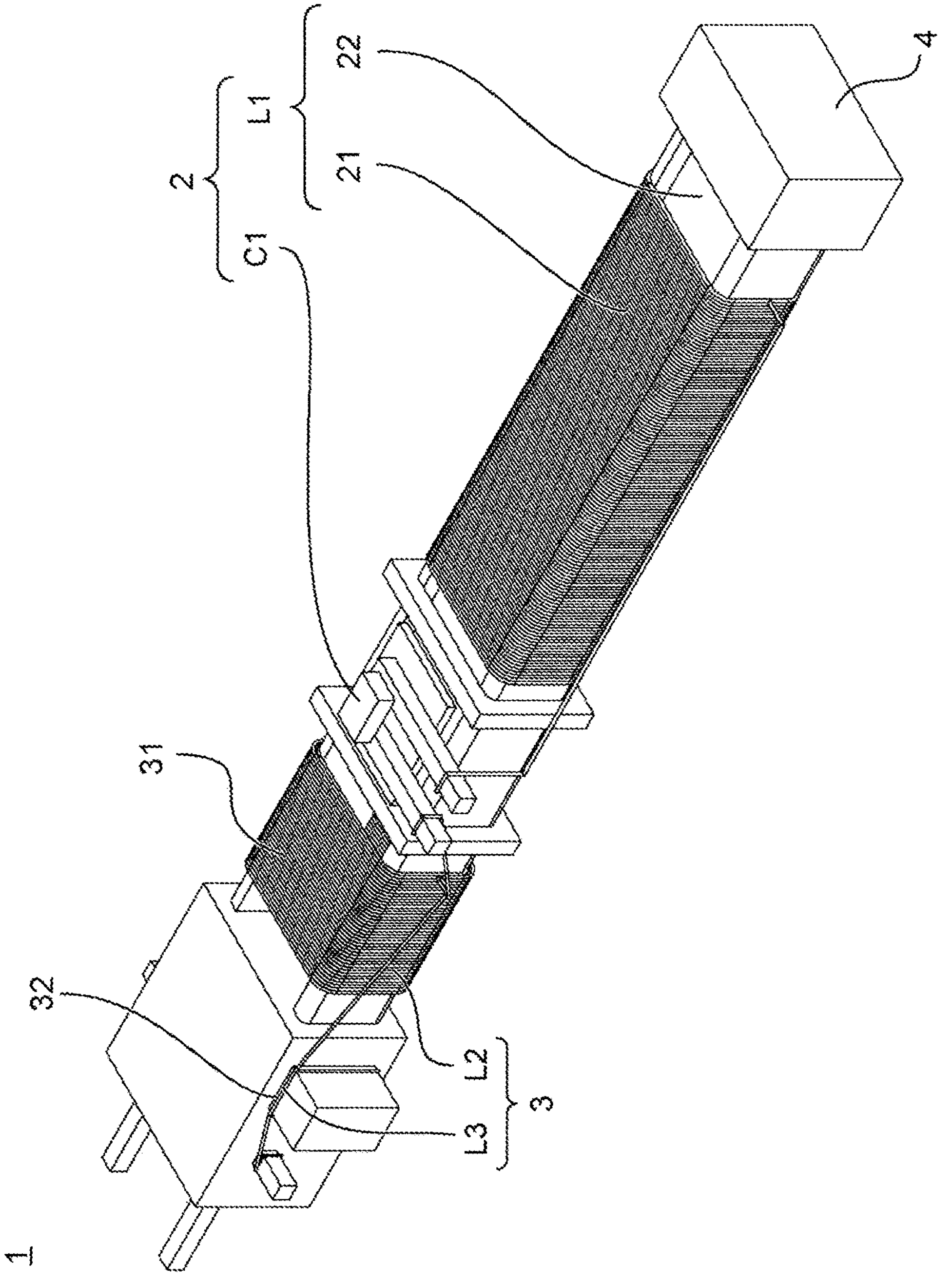
FIG. 2 is a perspective view of a configuration example of the antenna device of FIG. 1.
Figure 3:
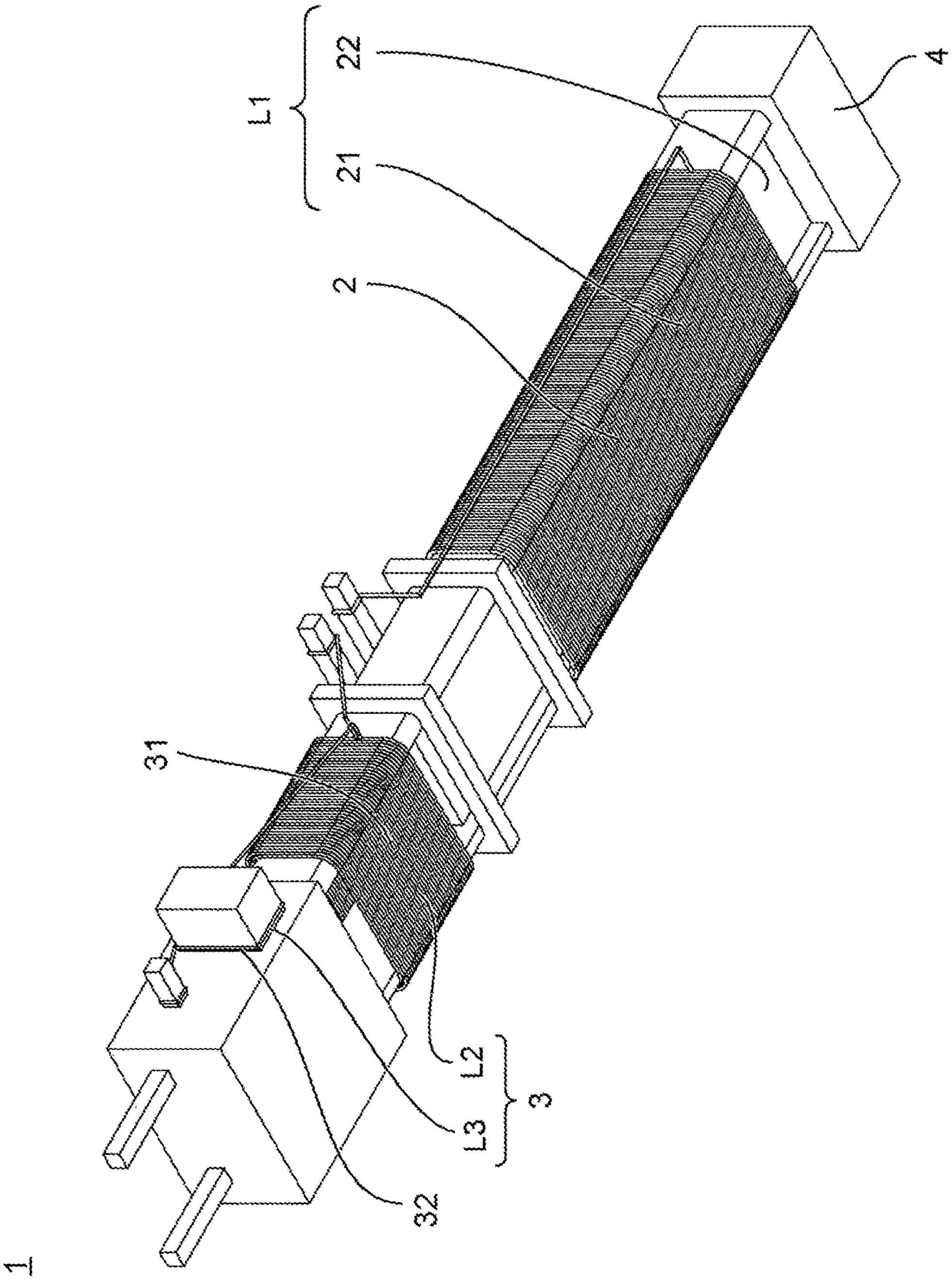
FIG. 3 is another perspective view of the antenna device of FIG. 1.
Figure 4:
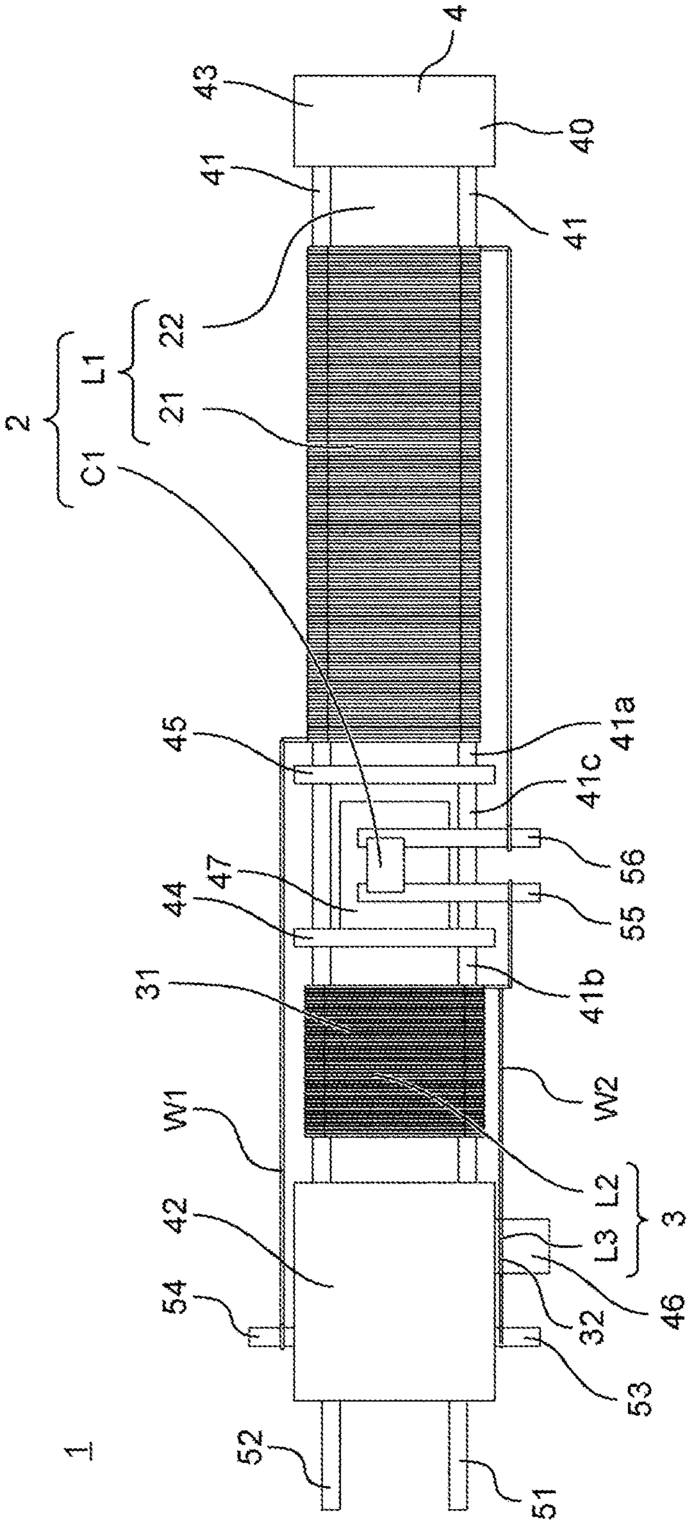
FIG. 4 is a plan view of the antenna device of FIG. 1.
Figure 5:
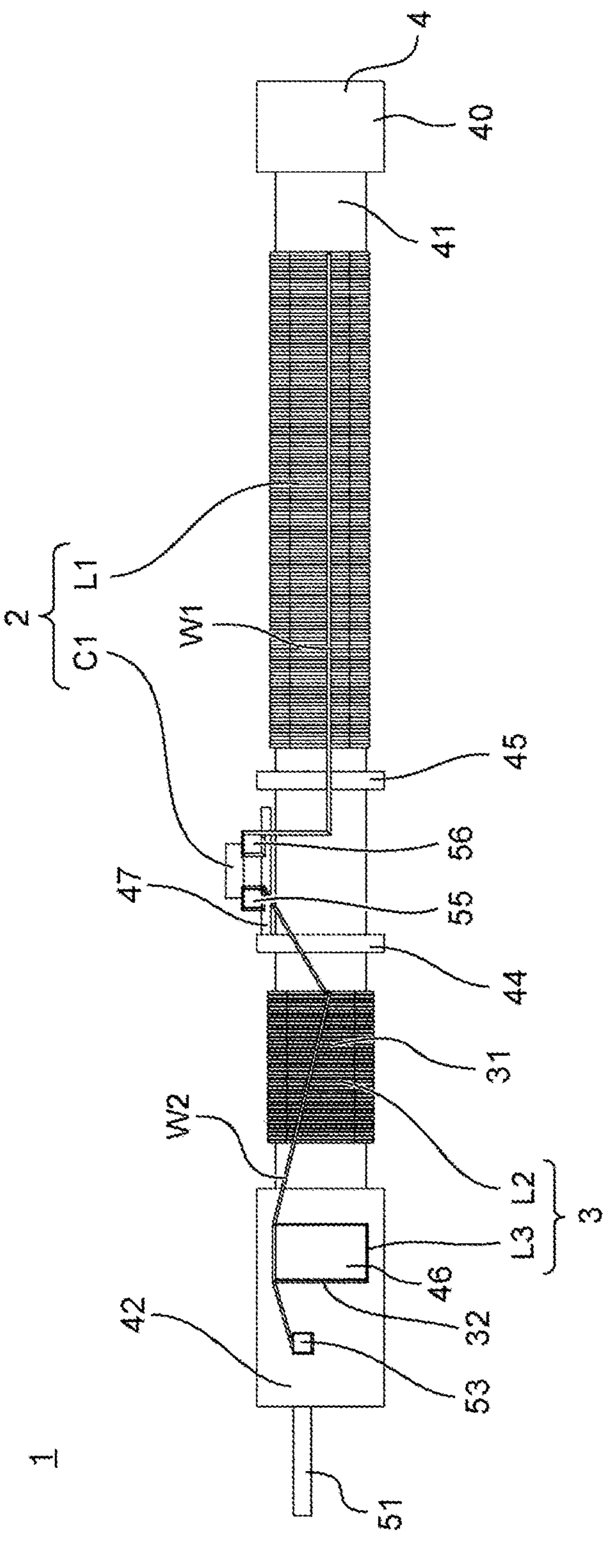
FIG. 5 is a side view of the antenna device of FIG. 1.

FIG. 2 to FIG. 5 illustrate the configuration example of the antenna device 1. FIG. 2 and FIG. 3 are perspective views of the antenna device 1. FIG. 4 is a plan view of the antenna device 1, and FIG. 5 is a side view of the antenna device 1. In the antenna device 1, the antenna circuit 2 has a first inductor L1. The first inductor L1 has a first winding 21 and a core 22 arranged inside the first winding 21. The resistance circuit 3 has a second inductor L2. The second inductor L2 has a second winding 31 comprising an air-core coil (e.g., without an internal core).

In the antenna device 1, the resistance value of the entire antenna device 1 can be adjusted by adjusting the resistance value of the resistance circuit 3. In particular, the resistance value of the resistance circuit 3 can be adjusted by adjusting the number of turns of the second winding 31 of the second inductor L2. By changing the number of turns of the second winding 31, the inductance of the second inductor L2, that is, the inductance of the antenna device 1 is also changed. However, since the second winding 31 is an air-core coil, the influence of the change in the number of turns of the second winding 31 on the inductance of the second inductor L2 is smaller than that in the case where the second winding 31 is a cored coil (e.g., first winding 21). Therefore, according to the present embodiment, it is possible to easily adjust the resistance value of the antenna device 1 while reducing the influence on the inductance of the antenna device 1 as a whole.

1-2. Details

Hereinafter, the antenna device 1 according to the present embodiment will be described in detail.

First, an electric circuit of the antenna device 1 will be described with reference to FIG. 1. As illustrated in FIG. 1, the antenna device 1 includes the antenna circuit 2 and the resistance circuit 3. The antenna circuit 2 includes the first inductor L1 and a capacitor C1. In FIG. 1, the capacitor C1 is electrically connected in series to the first inductor L1. The first inductor L1 and the capacitor C1 form a series resonant circuit. The resistance circuit 3 is electrically connected in series to the antenna circuit 2. The resistance circuit 3 includes the second inductor L2 and a third inductor L3. The third inductor L3 is electrically connected to the second inductor L2. In FIG. 1, the third inductor L3 is electrically connected in series to the second inductor L2.

Next, the structure of the antenna device 1 will be described with reference to FIG. 2 to FIG. 5. As illustrated in FIG. 2 to FIG. 5, the antenna device 1 includes the antenna circuit 2, the resistance circuit 3, and a bobbin 4.

The bobbin 4 holds the antenna circuit 2 and the resistance circuit 3. As illustrated in FIG. 2 to FIG. 5, the bobbin 4 has an elongated shape. The bobbin 4 includes a body 40 and first to sixth connection terminals 51 to 56. The body 40 is formed of a non-magnetic resin material having an insulating property. The first to sixth connection terminals 51 to 56 are formed integrally with the body 40 by, for example, insert molding.

As illustrated in FIG. 4 and FIG. 5, the body 40 includes a pair of side wall portions 41, a first end portion 42, a second end portion 43, a first flange portion 44, a second flange portion 45, a winding drum portion 46, and a holding plate 47. The pair of side wall portions 41, the first end portion 42, the second end portion 43, the first flange portion 44, the second flange portion 45, the winding drum portion 46, and the holding plate 47 are continuously and integrally formed.

The pair of side wall portions 41 form a drum portion of the bobbin 4. The pair of side wall portions 41 have an elongated plate shape. Moreover, the pair of side wall portions 41 are opposed to each other with a predetermined gap in between so that the length directions of the pair of side wall portions 41 are parallel to each other. The first end portion 42 has a rectangular parallelepiped shape. The first end portion 42 connects first ends (e.g., left ends in FIG. 4) of the pair of side wall portions 41 to each other. The second end portion 43 has a rectangular parallelepiped shape. Second ends (e.g., right ends in FIG. 4) of the pair of side wall portions 41 are connected to each other.

The first flange portion 44 has a rectangular frame shape. The first flange portion 44 is located between the first end portion 42 and the second end portion 43 in the pair of side wall portions 41. The second flange portion 45 has a rectangular frame shape. The second flange portion 45 is located between the first flange portion 44 and the second end portion 43 in the pair of side wall portions 41. The pair of side wall portions 41 are divided into a first region 41*a*, a second region 41*b*, and a third region 41*c* by the first flange portion 44 and the second flange portion 45. The first region 41*a* is a region between the second end portion 43 and the second flange portion 45 in the pair of side wall portions 41. The first region 41*a* is used to hold the first inductor L1 of the antenna circuit 2. The second region 41*b* is a region between the first end portion 42 and the first flange portion 44 in the pair of side wall portions 41. The second region 41*b* is used to hold the second inductor L2 of the resistance circuit 3. The third region 41*c* is a region between the first flange portion 44 and the second flange portion 45 in the pair of side wall portions 41. The third region 41*c* is used to hold the capacitor C1 of the antenna circuit 2.

The winding drum portion 46 is used to hold the third inductor L3 of the resistance circuit 3. The winding drum portion 46 has a rectangular parallelepiped shape. The cross-sectional area of the winding drum portion 46 is smaller than the cross-sectional area of the drum portion of the bobbin 4. The winding drum portion 46 protrudes from the first end portion 42. In particular, the winding drum portion 46 protrudes from the first end portion 42 in a direction orthogonal to the length direction of the pair of side wall portions 41.

The holding plate 47 is used to hold the capacitor C1 of the antenna circuit 2 and has a rectangular plate shape in an exemplary aspect. The holding plate 47 protrudes from the first flange portion 44 toward the second flange portion 45.

The first to sixth connection terminals 51 to 56 are used to electrically connect the antenna circuit 2 and the resistance circuit 3 to the antenna drive circuit 100. In an exemplary aspect, the first to sixth connection terminals 51 to 56 can be formed of a material having conductivity such as a metal material.

Each of the first and second connection terminals 51 and 52 has a bar shape that protrude from the first end portion 42. In particular, the first and second connection terminals 51 and 52 protrude from the first end portion 42 to the side opposite to the pair of side wall portions 41. The first and second connection terminals 51 and 52 are used to electrically connect the antenna device 1 to the antenna drive circuit 100.

Each of the third and fourth connection terminals 53 and 54 has a bar shape. The third and fourth connection terminals 53 and 54 protrude from the first end portion 42. The third and fourth connection terminals 53 and 54 are electrically connected to the first and second connection terminals 51 and 52, respectively. In particular, the third and fourth connection terminals 53 and 54 may be integrally formed with the first and second connection terminals 51 and 52, respectively. The third and fourth connection terminals 53 and 54 protrudes from the first end portion 42 in a direction orthogonal to the length direction of the pair of side wall portions 41. The protruding directions of the third and fourth connection terminals 53 and 54 are opposite to each other.

Each of the fifth and sixth connection terminals 55 and 56 has a bar shape. The fifth and sixth connection terminals 55 and 56 are fixed to the holding plate 47. In particular, the fifth and sixth connection terminals 55 and 56 are fixed to a surface of the holding plate 47 on a side opposite to the pair of side wall portions 41.

As illustrated in FIG. 2 and FIG. 3, the antenna circuit 2 includes the first inductor L1 and the capacitor C1.

As illustrated in FIG. 4 and FIG. 5, the first inductor L1 includes the first winding 21 and the core 22.

The first winding 21 is formed by a conducting wire W1. More specifically, the conducting wire W1 is wound around the first region 41*a* of the pair of side wall portions 41 of the bobbin 4 such that the axial direction of the first winding 21 coincides with the length direction of the pair of side wall portions 41. A portion of the conducting wire W1 wound around the first region 41*a* forms the first winding 21. The number of turns of the first winding 21 is, for example, 100. Both ends of the conducting wire W1 are fixed and electrically connected to the fourth connection terminal 54 and the sixth connection terminal 56, respectively. For example, both ends of the conducting wire W1 are bound and bonded to the fourth connection terminal 54 and the sixth connection terminal 56, respectively.

In an exemplary aspect, the core 22 has a prismatic shape. Moreover, the core 22 can be made of, for example, ceramics such as ferrite. Ceramics have high heat resistance. The core 22 is accommodated in a space between the pair of side wall portions 41. Thus, the core 22 is arranged inside the first winding 21. As illustrated in FIG. 4 and FIG. 5, the core 22 exists in the first region 41*a* and the third region 41*c* but does not exist in the second region 41*b*.

In this way, the first winding 21 and the core 22 form a cored coil. The cored coil is a coil, in which a path of a magnetic flux generated by making a current pass through the coil, is made of a magnetic material.

The capacitor C1 is arranged on the holding plate 47. In particular, the capacitor C1 is arranged on the fifth and sixth connection terminals 55 and 56 on the holding plate 47. Both ends of the capacitor C1 are fixed and electrically connected to the fifth and sixth connection terminals 55 and 56, respectively. In this way, the capacitor C1 is electrically connected in series to the first inductor L1. In addition, the capacitor C1 is arranged between the first inductor L1 and the second inductor L2 to be described later. With this arrangement, it is possible to increase the distance between the first inductor L1 and the second inductor L2 and suppress the influence of the inductance of the second inductor L2 on the first inductor L1.

As illustrated in FIG. 2 and FIG. 3, the resistance circuit 3 includes the second inductor L2 and the third inductor L3.

The second inductor L2 includes the second winding 31. The second winding 31 is formed by a conducting wire W2, and the first inductor L1 and the second inductor L2 are formed by coils different from each other. More specifically, the conducting wire W2 is wound around the second region 41*b* of the pair of side wall portions 41 of the bobbin 4 such that the axial direction of the second winding 31 coincides with the length direction of the pair of side wall portions 41. A portion of the conducting wire W2 wound around the second region 41*b* forms the second winding 31. The number of turns of the second winding 31 is, for example, 60. As described above, the core 22 is not present in the second region 41*b*. The second winding 31 forms an air-core coil. The air-core coil refers to a coil in which a path of a magnetic flux generated by making a current pass through the coil is air or an insulator of a non-magnetic material.

The third inductor L3 is electrically connected to the second inductor L2 and includes a third winding 32. The third winding 32 is formed by the conducting wire W2. More specifically, the conducting wire W2 is wound around the winding drum portion 46 of the bobbin 4. A portion of the conducting wire W2 wound around the winding drum portion 46 forms the third winding 32. The number of turns of the third winding 32 is, for example, 10. Since the winding drum portion 46 is a non-magnetic body, the third winding 32 forms an air-core coil. As described above, since the winding drum portion 46 protrudes from the first end portion 42 in a direction orthogonal to the length direction of the pair of side wall portions 41, the axial direction of the third winding 32 is the direction orthogonal to the length direction of the pair of side wall portions 41. Therefore, the axial direction of the third winding 32 intersects (in the present embodiment, is orthogonal to) the axial direction of the first winding 21. In FIG. 3, the winding axis of the third winding 32 and the winding axis of the first winding 21 are orthogonal to each other. As such, the direction of the magnetic flux generated by the third winding 32 and the direction of the magnetic flux generated by the first winding 21 intersect each other. Therefore, the mutual induction effect between the third inductor L3 and the first inductor L1 can be reduced, and the influence of the change in the inductance of the third inductor L3 can be reduced. In addition, the axial direction of the third winding 32 intersects (in the present embodiment, is orthogonal to) the axial direction of the second winding 31. In FIG. 3, the winding axis of the third winding 32 and the winding axis of the second winding 31 are orthogonal to each other. As such, the direction of the magnetic flux generated by the third winding 32 and the direction of the magnetic flux generated by the second winding 31 intersect each other. Therefore, the mutual induction effect between the third inductor L3 and the second inductor L2 can be reduced, and the influence of the change in the inductance of the third inductor L3 can be reduced.

Since the second winding 31 and the third winding 32 are formed by the same conducting wire W2, they are electrically connected to each other in series. Both ends of the conducting wire W2 are fixed and electrically connected to the third connection terminal 53 and the fifth connection terminal 55, respectively. For example, both ends of the conducting wire W2 are bound and bonded to the third connection terminal 53 and the fifth connection terminal 55, respectively.

The resistivity (specific resistance) of the conducting wire W2 is higher than the resistivity of the conducting wire W1. The conducting wire W1 is, for example, a copper wire, and the conducting wire W2 is, for example, a conducting wire using a metal having a resistivity higher than that of copper, such as nichrome or iron. Therefore, the resistivity of the second winding 31 is higher than the resistivity of the first winding 21. As such, as compared with the case where the same conducting wire W1 as that of the first winding 21 is used for the second winding 31, the length of the conducting wire required for setting the resistance value of the second winding 31 to a desired resistance value can be shortened, and the number of turns of the second winding 31 can be reduced. As a result, the size of the second winding 31 can be reduced, the space required for arranging the second winding 31 can be reduced, and the time required for forming the second winding 31 can be shortened. The resistivity of the third winding 32 is greater than the resistivity of the first winding 21. Therefore, as compared with the case where the same conducting wire W1 as that of the first winding 21 is used for the third winding 32, the length of the conducting wire required for setting the resistance value of the third winding 32 to a desired resistance value can be shortened, and the number of turns of the third winding 32 can be reduced. As a result, the size of the third winding 32 can be reduced, the space required for arranging the third winding 32 can be reduced, and the time required for forming the third winding 32 can be shortened.

The antenna device 1 includes the first connection terminal 51 and the second connection terminal 52 electrically connected to the antenna drive circuit 100. The first connection terminal 51 is electrically connected to the third connection terminal 53. A series circuit of the second inductor L2 and the third inductor L3 of the resistance circuit 3 is electrically connected between the third connection terminal 53 and the fifth connection terminal 55. The capacitor C1 of the antenna circuit 2 is electrically connected between the fifth connection terminal 55 and the sixth connection terminal 56. The first inductor L1 of the antenna circuit 2 is electrically connected between the fourth connection terminal 54 and the sixth connection terminal 56. The fourth connection terminal 54 is electrically connected to the second connection terminal 52. Therefore, the series circuit of the antenna circuit 2 and the resistance circuit 3 is electrically connected between the first and second connection terminals 51 and 52.

1-3. Adjustment of Resistance Value

In the antenna device 1, the resistance value of the entire antenna device 1 can be adjusted by adjusting the resistance value of the resistance circuit 3. The resistance value of the resistance circuit 3 is determined by the resistance value of the second winding 31 of the second inductor L2 and the resistance value of the third winding 32 of the third inductor L3. In the present embodiment, the resistance value of the resistance circuit 3 is the sum of the resistance value of the second winding 31 of the second inductor L2 and the resistance value of the third winding 32 of the third inductor L3. The resistance value of the second winding 31 of the second inductor L2 depends on a conducting wire diameter and a conducting wire length of the second winding 31. The conducting wire diameter of the second winding 31 is the diameter of the conducting wire forming the second winding 31. The conducting wire length of the second winding 31 is the length of the conducting wire forming the second winding 31. The resistance value of the third winding 32 of the third inductor L3 depends on the conducting wire diameter and the conducting wire length of the third winding 32. The conducting wire diameter of the third winding 32 is the diameter of the conducting wire forming the third winding 32. The conducting wire length of the third winding 32 is the length of the conducting wire forming the third winding 32. As such, the conducting wire diameter and the conducting wire length of the second winding 31 and the third winding 32 may be set so that the resistance value of the resistance circuit 3 becomes a desired resistance value. Therefore, it is easy to design the resistance value of the resistance circuit 3 and to manage the manufacturing. As such, the resistance value of the resistance circuit 3 can be stably set.

In the antenna device 1, the conducting wire lengths of the second winding 31 and the third winding 32 are proportional to the numbers of turns of the second winding 31 and the third winding 32. Therefore, the resistance value of the resistance circuit 3 can be adjusted by adjusting the number of turns of the second winding 31 of the second inductor L2 and the number of turns of the third winding 32 of the third inductor L3. In the present embodiment, the second winding 31 and the third winding 32 are formed by the same conducting wire W2, but the cross-sectional area of the winding drum portion 46 is smaller than the cross-sectional area of the drum portion of the bobbin 4. As such, the cross-sectional area of the third winding 32 is smaller than the cross-sectional area of the second winding 31. Therefore, a change in inductance due to a change in the number of turns of the third winding 32 can be made smaller than a change in inductance due to a change in the number of turns of the second winding 31. Accordingly, it is possible to reduce the influence of the change in the inductance of the third inductor L3. In addition, a change in the conducting wire length of the third winding 32 with respect to a change in the number of turns of the third winding 32 can be made smaller than a change in the conducting wire length of the second winding 31 with respect to a change in the number of turns of the second winding 31. Therefore, according to the third winding 32, the resistance value of the resistance circuit 3 can be adjusted more finely than the second winding 31. In the antenna device 1, the resistance value of the resistance circuit 3 is adjusted mainly by adjusting the number of turns of the second winding 31. The adjustment of the resistance value of the resistance circuit 3 by the number of turns of the third winding 32 is used for fine adjustment of the resistance value of the resistance circuit 3 after the number of turns of the second winding 31 is determined. As described above, since the influence of the change in the inductance of the third inductor L3 can be reduced, the resistance value can be adjusted by the third winding 32 without affecting the second winding 31.

In the antenna device 1, by changing the numbers of turns of the second winding 31 and the third winding 32, the inductances of the second inductor L2 and the third inductor L3, that is, the inductance of the antenna device 1 can also be changed. The change in the inductance of the antenna device 1 may affect the resonant frequency of the antenna device 1. However, since the second winding 31 and the third winding 32 are air-core coils, the influence of the change in the numbers of turns of the second winding 31 and the third winding 32 on the inductances of the second inductor L2 and the third inductor L3 is smaller than that in the case where the second winding 31 and the third winding 32 are cored coils. Therefore, according to the present embodiment, the resistance value of the antenna device 1 can easily be adjusted while reducing the influence on the inductance of the antenna device 1.

Figure 6:
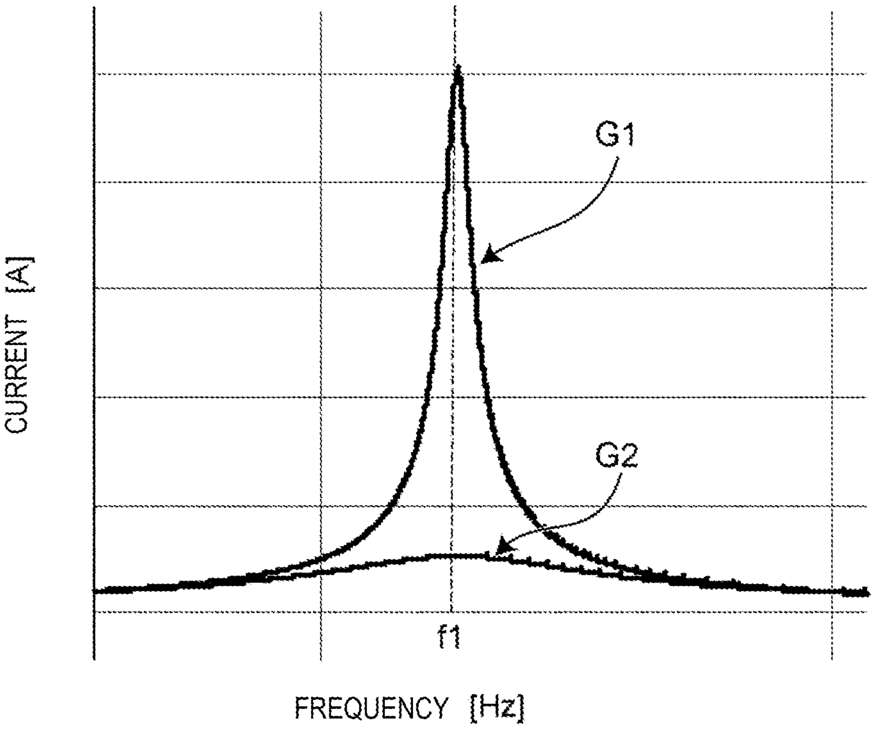
FIG. 6 is a graph illustrating a relationship between a frequency and a current of the antenna device of FIG. 1.
Figure 7:
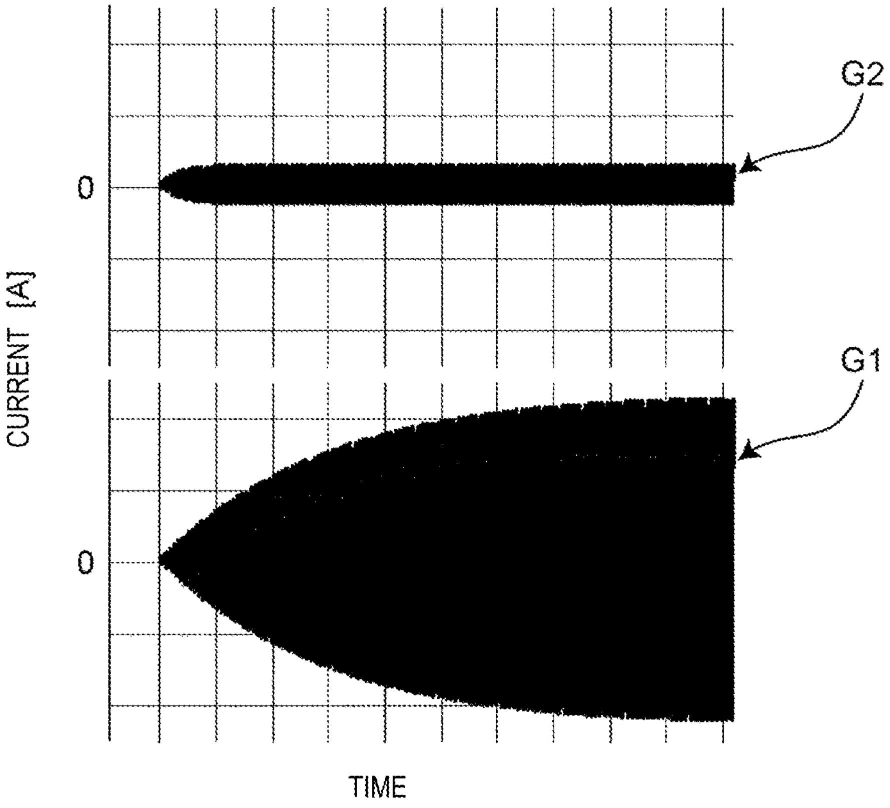
FIG. 7 is a graph illustrating a temporal change of a current of the antenna device of FIG. 1.

Next, the influence of the resistance value of the resistance circuit 3 will be described with reference to FIG. 6 and FIG. 7. FIG. 6 is a graph illustrating the relationship between the frequency and the current of the antenna device 1. FIG. 7 is a graph illustrating a temporal change in the current of the antenna device 1. In FIG. 6 and FIG. 7, G1 indicates a case where the resistance value of the resistance circuit 3 is set to a first value, and G2 indicates a case where the resistance value of the resistance circuit 3 is set to a second value larger than the first value. The first value is, for example, 1Ω, and the second value is, for example, 10Ω. By adjusting the resistance value of the resistance circuit 3, the magnitude of the current at a specific frequency f1 can be adjusted, and the Q value can be adjusted. The specific frequency is, for example, a resonant frequency of the antenna circuit 2. The resonant frequency is, for example, 125 kHz. As can be seen in FIG. 6 and FIG. 7, when the resistance value of the resistance circuit 3 is increased, the Q value can be decreased. Therefore, the resistance circuit 3 can be used as a damping resistor. Here, the antenna device 1 is electrically connected to the antenna drive circuit 100 by the first and second connection terminals 51 and 52. The series circuit of the antenna circuit 2 and the resistance circuit 3 is electrically connected between the first and second connection terminals 51 and 52. Thus, the resistance circuit 3 can be arranged away from the antenna drive circuit 100. Therefore, the influence of heat generated in the resistance circuit 3 on the antenna drive circuit 100 can be reduced. In addition, since the antenna device 1 has the resistance circuit 3, it is not necessary to provide a resistor which may be a heat source such as a damping resistor in the antenna drive circuit 100. Therefore, the influence of heat on electronic components of the antenna drive circuit 100 can be reduced.

1-4. Effects and the Like

As described above, the antenna device 1 includes the antenna circuit 2 having the first inductor L1 and the resistance circuit 3 that has the second inductor L2 and is electrically connected to the antenna circuit 2. The first inductor L1 has a first winding 21 and a core 22 arranged inside the first winding 21. The second inductor L2 has the second winding 31 forming an air-core coil. This makes it possible to easily adjust the resistance value of the antenna device 1 while reducing the influence on the inductance of the antenna device 1.

In addition, in the antenna device 1, the resistivity of the second winding 31 is higher than the resistivity of the first winding 21. This configuration enables the shortening of the length of the conducting wire required to set the resistance value of the second winding 31 to a desired resistance value as compared with the case where the same conducting wire W1 as that of the first winding 21 is used for the second winding 31.

In addition, in the antenna device 1, the number of turns of the second winding 31 is smaller than the number of turns of the first winding 21. Thus, the time required for forming the second winding 31 can be shortened.

In addition, in the antenna device 1, the resistance circuit 3 has the third inductor L2 electrically connected to the second inductor L3. The third inductor L3 has the third winding 32 forming an air-core coil. The axial direction of the third winding 32 intersects the axial direction of the second winding 31. Thus, since the resistance value of the antenna device 1 can be adjusted by adjusting the number of turns of the second winding 31 and the number of turns of the third winding 32, fine adjustment of the resistance value of the antenna device 1 becomes possible. In addition, since the direction of the magnetic flux generated by the third winding 32 and the direction of the magnetic flux generated by the second winding 31 intersect each other, the influence of the change in the inductance of the third inductor L3 can be reduced.

In addition, in the antenna device 1, the cross-sectional area of the third winding 32 is smaller than the cross-sectional area of the second winding 31. As a result, the change in inductance due to the change in the number of turns of the third winding 32 can be made smaller than the change in inductance due to the change in the number of turns of the second winding 31, so that the influence of the change in inductance of the third inductor L3 can be reduced.

In addition, in the antenna device 1, the resistivity of the third winding 32 is higher than the resistivity of the first winding 21. This configuration makes it possible to shorten the length of the conducting wire required to set the resistance value of the third winding 32 to a desired resistance value as compared with the case where the same conducting wire W1 as that of the first winding 21 is used for the third winding 32.

In addition, in the antenna device 1, the antenna circuit 2 has the capacitor C1 electrically connected to the first inductor L1. The first inductor L1 is located on the side opposite to the second inductor L2 with respect to the capacitor C1. Thus, the capacitor C1 can reduce the influence of heat generated in the second inductor L2 on the first inductor L1 and can reduce the temperature variation of the inductance of the first inductor L1.

In addition, in the antenna device 1, the inductance of the second inductor L2 is smaller than the inductance of the first inductor L1. This configuration provides for easy adjustment of the resistance value of the antenna device 1 while reducing the influence on the inductance of the antenna device 1.

In addition, the antenna device 1 includes the first and second connection terminals 51 and 52 that are electrically connected to the antenna drive circuit 100. The antenna circuit 2 and the resistance circuit 3 are electrically connected between the first and second connection terminals 51 and 52. Thus, since the resistance circuit 3 can be arranged away from the antenna drive circuit 100, the influence of heat generated in the resistance circuit 3 on the antenna drive circuit 100 can be reduced.

2. Embodiment 2

Figure 8:
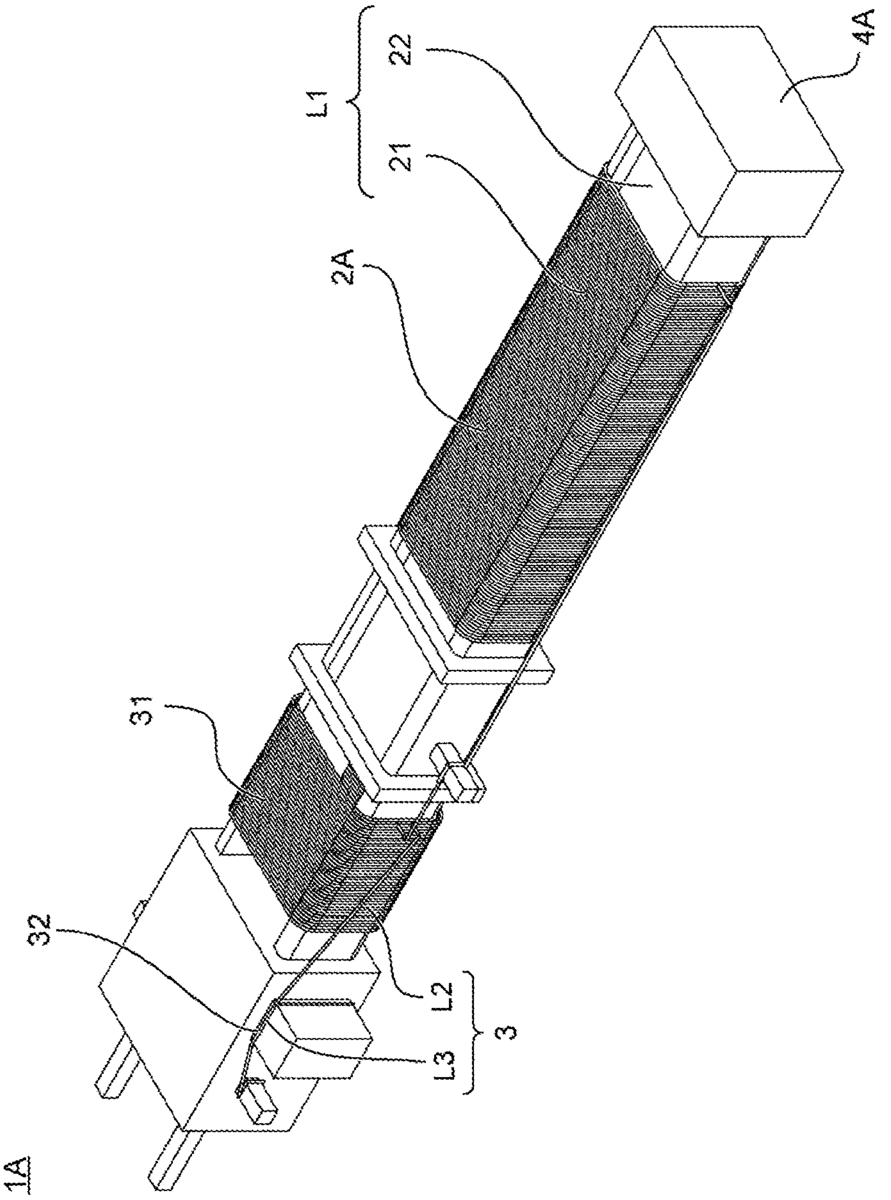
FIG. 8 is a perspective view of a configuration example of an antenna device according to exemplary Embodiment 2.
Figure 9:
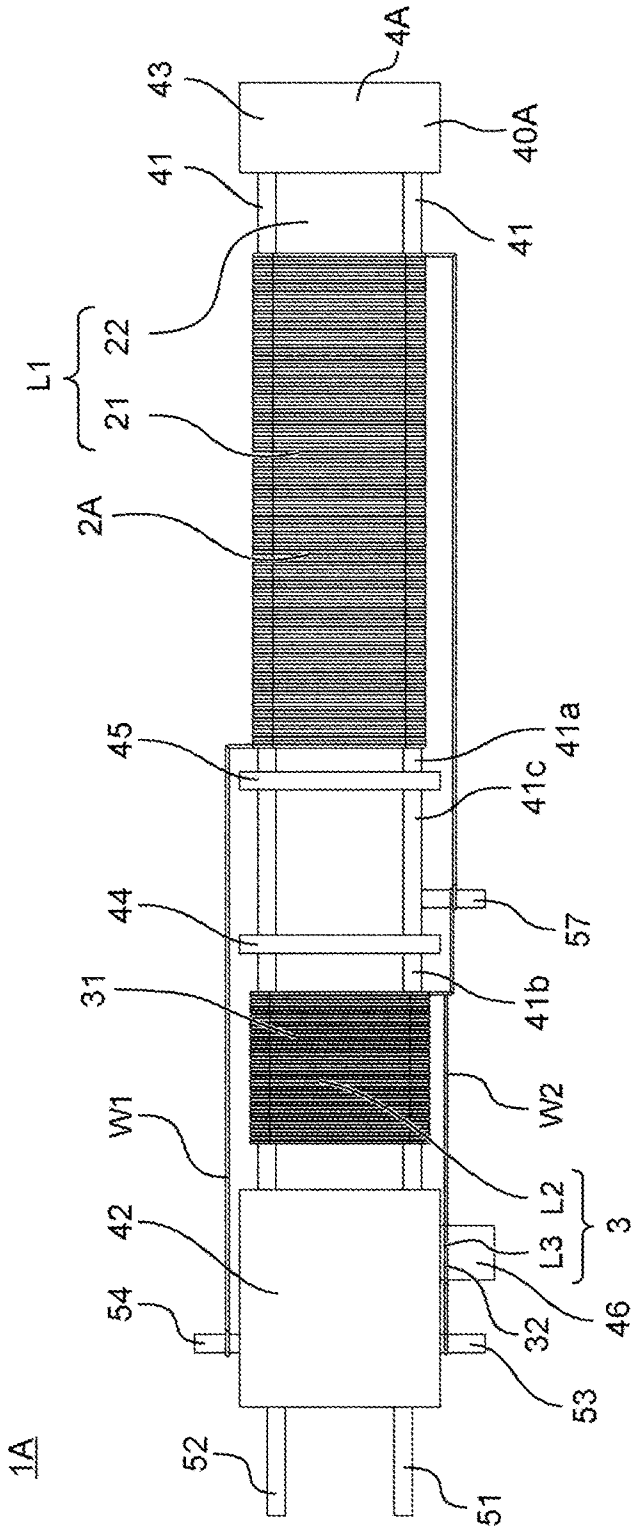
FIG. 9 is a plan view of the antenna device of FIG. 8.
Figure 10:
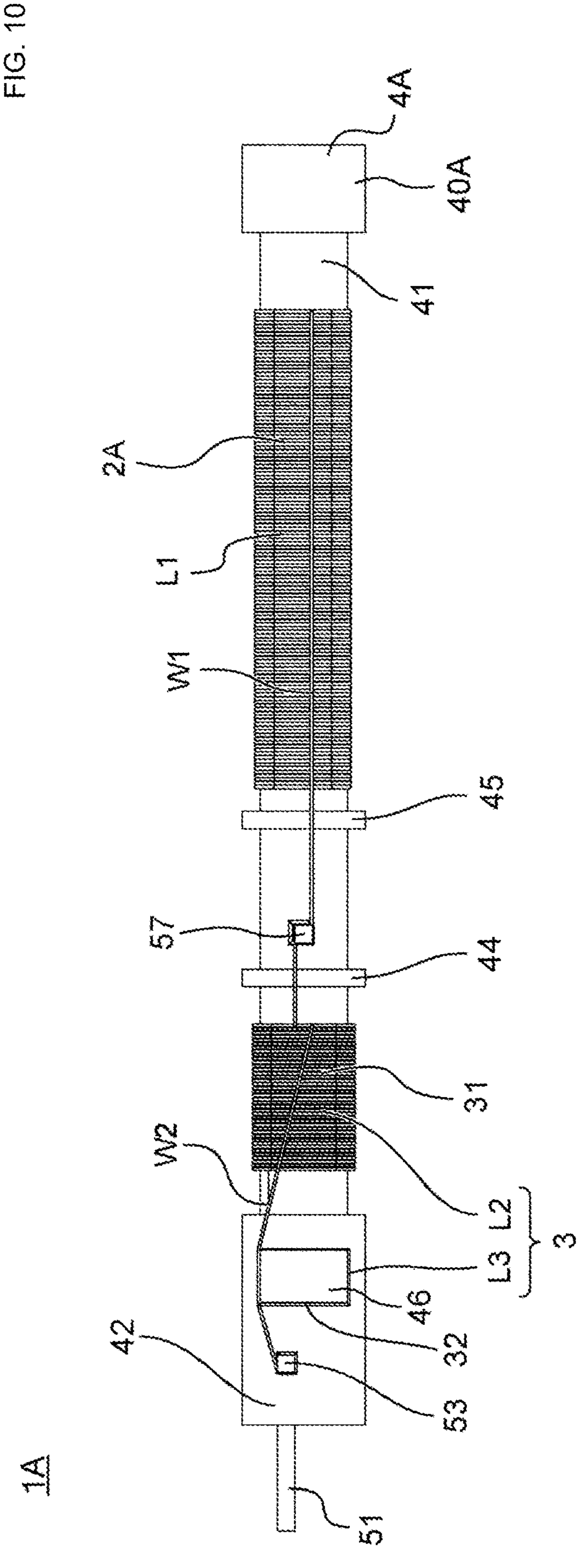
FIG. 10 is a side view of the antenna device of FIG. 8.

FIG. 8 to FIG. 10 illustrate the configuration example of an antenna device 1A according to the present embodiment.

FIG. 8 is a perspective view of the antenna device 1A. FIG. 9 is a plan view of the antenna device 1A, and FIG. 10 is a side view of the antenna device 1A.

The antenna device 1A is connected to the antenna drive circuit 100, as in the case of the antenna device 1 illustrated in FIG. 1. As illustrated in FIG. 8, the antenna device 1A includes an antenna circuit 2A, a resistance circuit 3, and a bobbin 4A.

As further shown, the antenna circuit 2A includes the first inductor L1. Unlike the antenna circuit 2 illustrated in FIG. 2 to FIG. 5, the antenna circuit 2A does not have the capacitor C1. The resistance circuit 3 is electrically connected in series to the antenna circuit 2A. The resistance circuit 3 includes the second inductor L2 and the third inductor L3.

As illustrated in FIG. 9 and FIG. 10, the bobbin 4A holds the antenna circuit 2A and the resistance circuit 3. The bobbin 4A has an elongated shape. The bobbin 4A includes a body 40A, the first to fourth connection terminals 51 to 54, and a seventh connection terminal 57. The body 40A is formed of a non-magnetic resin material having insulating properties. The first to fourth connection terminals 51 to 54 and the seventh connection terminal 57 are formed integrally with the body 40A by, for example, insert-molding.

As illustrated in FIG. 9 and FIG. 10, the body 40A includes the pair of side wall portions 41, the first end portion 42, the second end portion 43, the first flange portion 44, the second flange portion 45, and the winding drum portion 46. The pair of side wall portions 41, the first end portion 42, the second end portion 43, the first flange portion 44, the second flange portion 45, and the winding drum portion 46 are continuously and integrally formed. Unlike the body 40 illustrated in FIG. 2 to FIG. 5, the body 40A does not include the holding plate 47.

The first to fourth connection terminals 51 to 54 and the seventh connection terminal 57 are used to electrically connect the antenna circuit 2A and the resistance circuit 3 to the antenna drive circuit 100. The first to fourth connection terminals 51 to 54 and the seventh connection terminal 57 are formed of a material having conductivity such as a metal material. The seventh connection terminal 57 has a bar shape. The seventh connection terminal 57 protrudes from one of the pair of side wall portions 41. In particular, the seventh connection terminal 57 protrudes in a direction orthogonal to the length direction of the pair of side wall portions 41. In addition, the seventh connection terminal 57 is located in the third region 41*c*.

Next, the structure of the antenna circuit 2A will be described with reference to FIG. 9 and FIG. 10. As described above, the antenna circuit 2A includes the first inductor L1. The first inductor L1 includes the first winding 21 and the core 22. In the antenna circuit 2A, both ends of the conducting wire W1 forming the first winding 21 are fixed and electrically connected to the fourth connection terminal 54 and the seventh connection terminal 57, respectively. For example, both ends of the conducting wire W1 are bound and bonded to the fourth connection terminal 54 and the seventh connection terminal 57, respectively.

As illustrated in FIG. 9 and FIG. 10, the resistance circuit 3 includes the second inductor L2 and the third inductor L3. In the resistance circuit 3, both ends of the conducting wire W2 forming the second winding 31 of the second inductor L2 and the third winding 32 of the third inductor L3 are fixed and electrically connected to the third connection terminal 53 and the seventh connection terminal 57, respectively. For example, both ends of the conducting wire W2 are bound and bonded to the third connection terminal 53 and the seventh connection terminal 57, respectively.

The antenna device 1A includes the first and second connection terminals 51 and 52 that are electrically connected to the antenna drive circuit 100. The first connection terminal 51 is electrically connected to the third connection terminal 53. A series circuit of the second inductor L2 and the third inductor L3 of the resistance circuit 3 is electrically connected between the third connection terminal 53 and the seventh connection terminal 57. The first inductor 2A of the antenna circuit L1 is electrically connected between the fourth connection terminal 54 and the seventh connection terminal 57. The fourth connection terminal 54 is electrically connected to the second connection terminal 52. Therefore, the series circuit of the antenna circuit 2A and the resistance circuit 3 is electrically connected between the first and second connection terminals 51 and 52.

The antenna device 1A described above includes the resistance circuit 3, as in the case of the antenna device 1 illustrated in FIG. 2 to FIG. 5. Therefore, it is possible to easily adjust the resistance value of the antenna device 1A while reducing the influence on the inductance of the antenna device 1A.

3. Embodiment 3

3-1. Configuration

Figure 11:
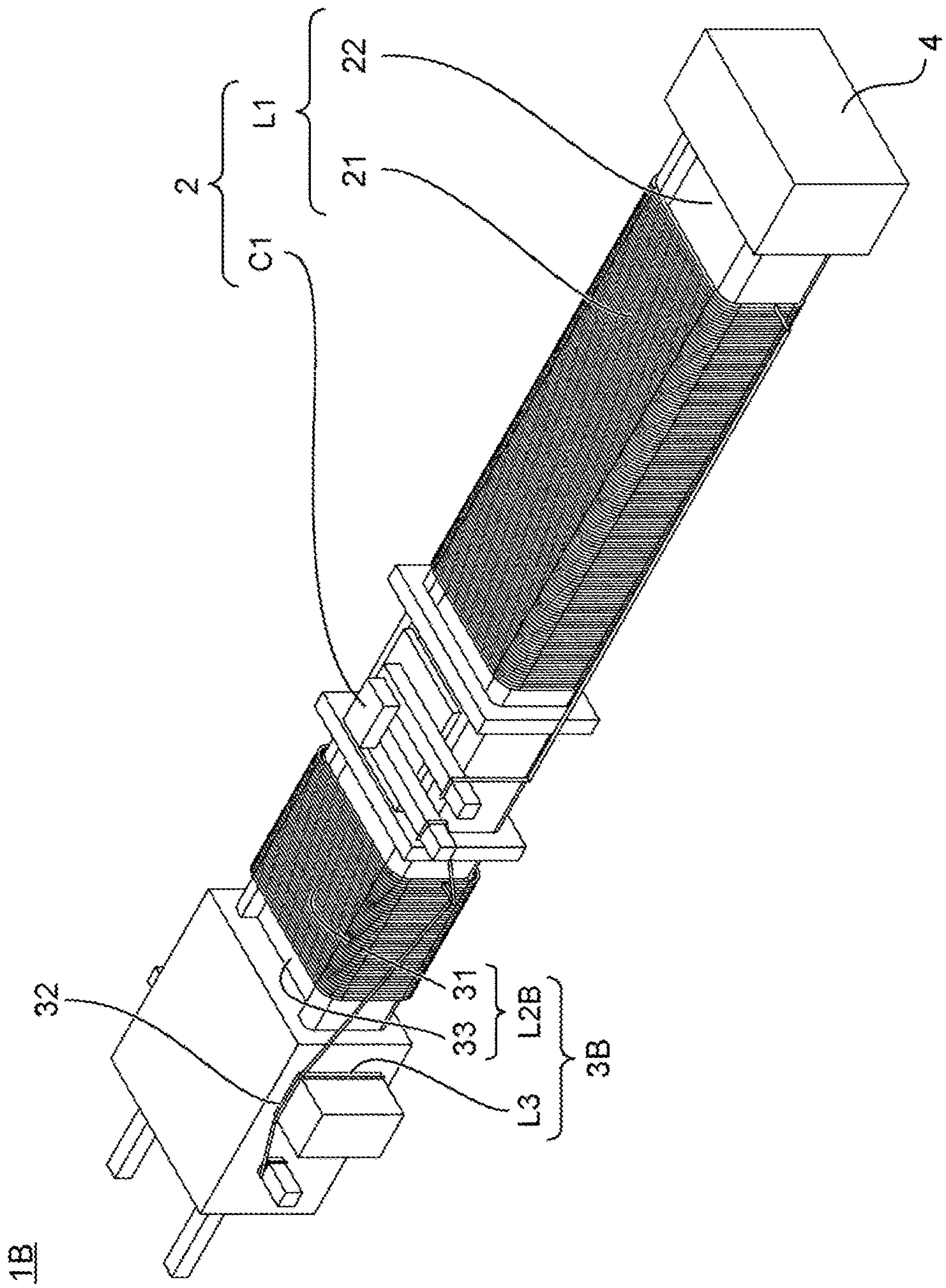
FIG. 11 is a perspective view of a configuration example of an antenna device according to exemplary Embodiment 3.
Figure 12:
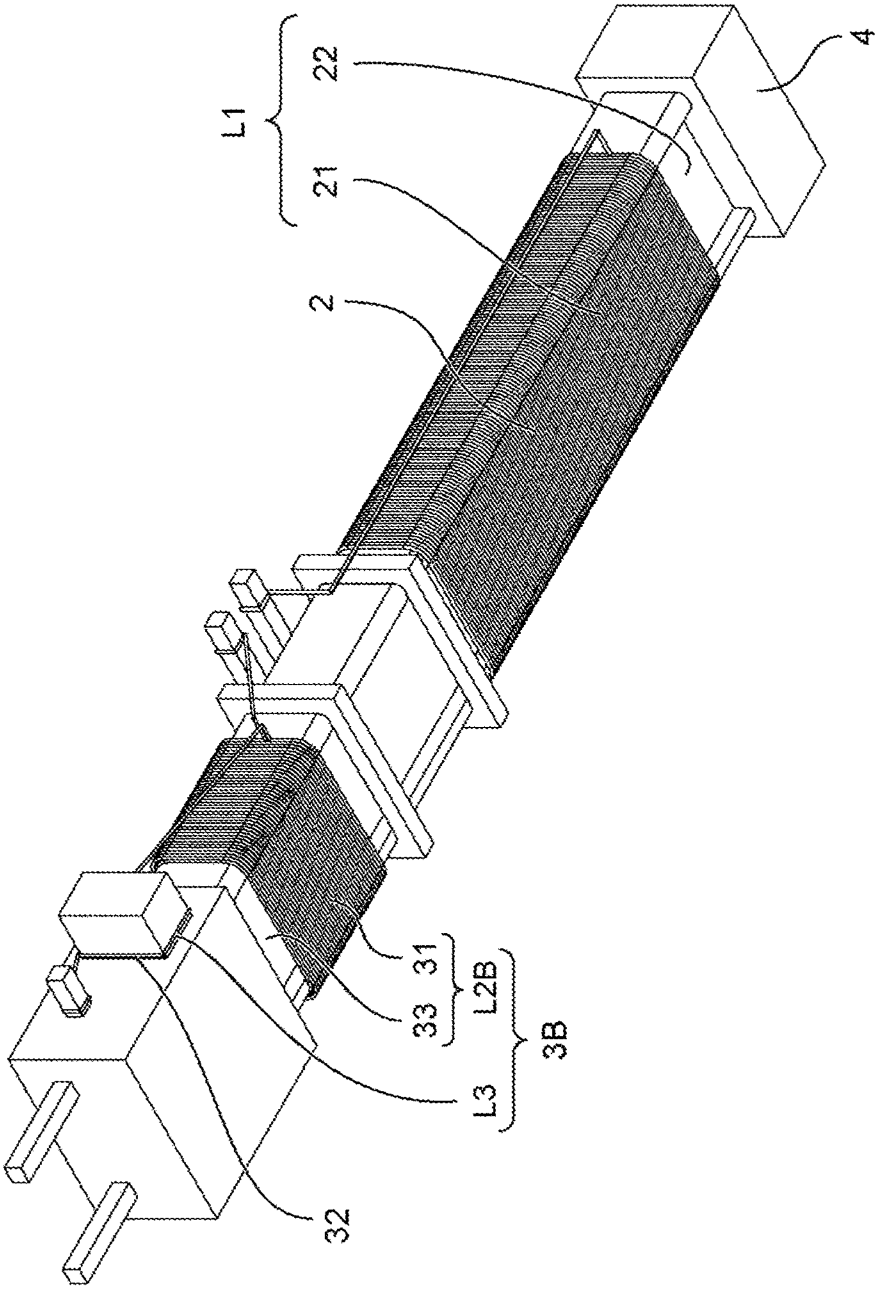
FIG. 12 is another perspective view of the antenna device of FIG. 11.
Figure 13:
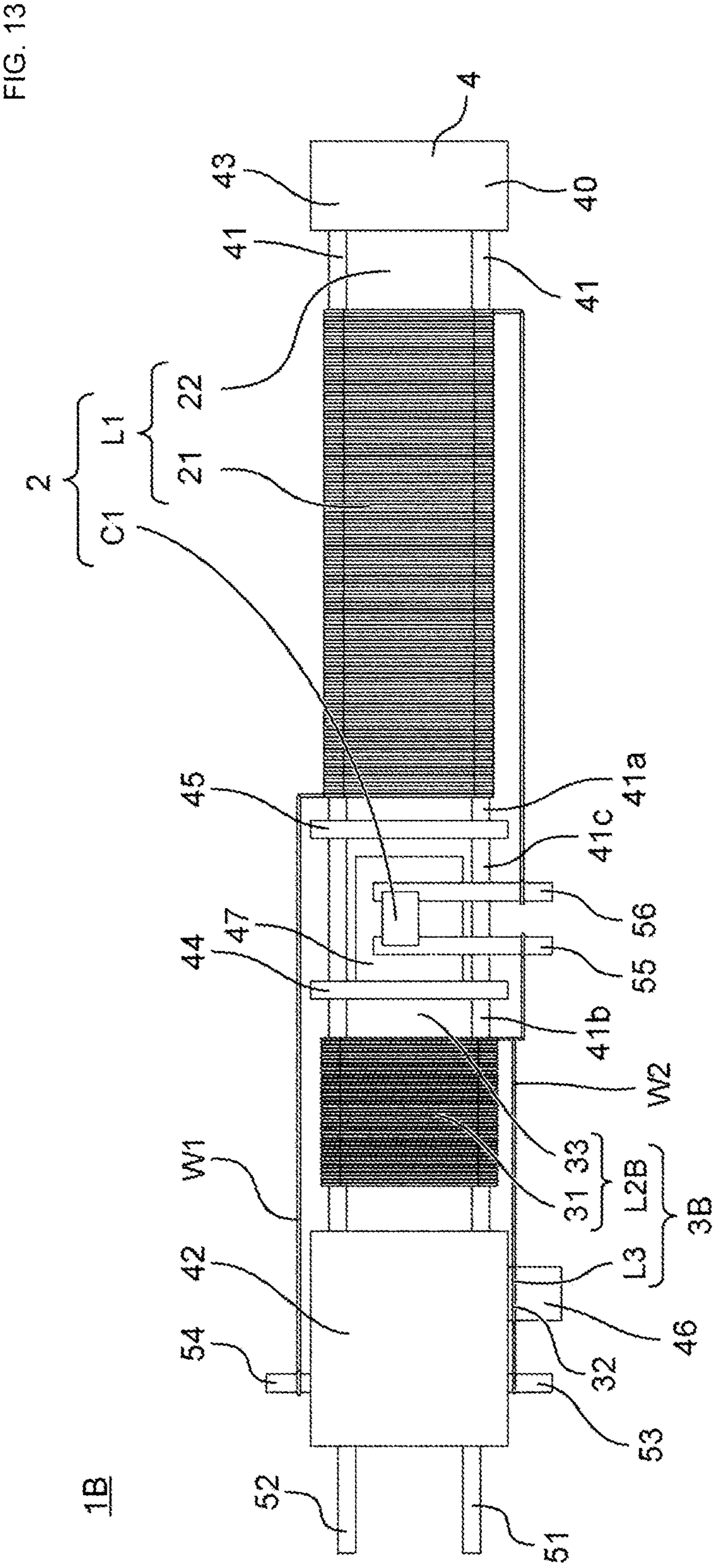
FIG. 13 is a plan view of the antenna device of FIG. 11.
Figure 14:
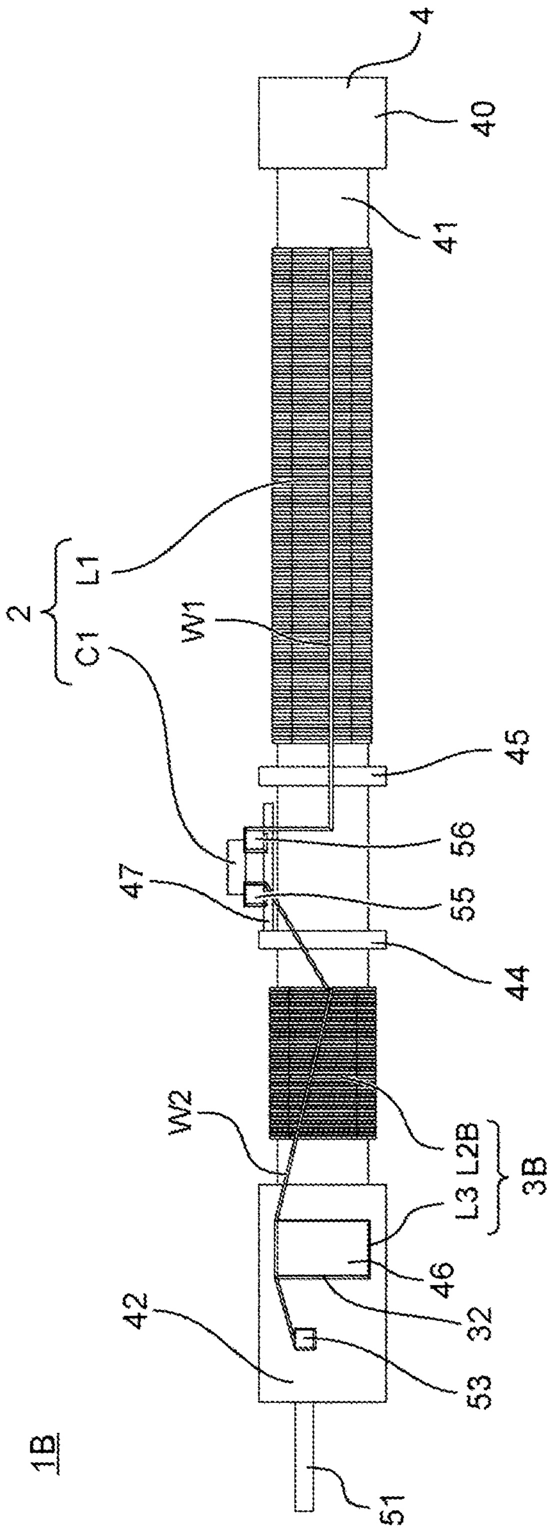
FIG. 14 is a side view of the antenna device of FIG. 11.

FIG. 11 to FIG. 14 illustrate the configuration example of an antenna device 1B. FIG. 11 and FIG. 12 are perspective views of the antenna device 1B. FIG. 13 is a plan view of the antenna device 1B, and FIG. 14 is a side view of the antenna device 1B.

As illustrated in FIG. 11 and FIG. 12, the antenna device 1B includes the antenna circuit 2, a resistance circuit 3B electrically connected to the antenna circuit 2, and the bobbin 4 holding the antenna circuit 2 and the resistance circuit 3B. The antenna device 1B is connected to the antenna drive circuit 100, as in the case of the antenna device 1 illustrated in FIG. 1. That is, the antenna device 1B is connected to the antenna drive circuit 100 so as to be electrically connected in parallel to the switching element Q2 of the switching circuit 110.

As illustrated in FIG. 13 and FIG. 14, the antenna circuit 2 includes the first inductor L1 and the capacitor C1. The first inductor L1 includes the first winding 21 and the core 22 (hereinafter referred to as the first core 22). In the present embodiment, the capacitor C1 is made of ceramics according to an exemplary aspect, as ceramics have high heat resistance.

As illustrated in FIG. 13 and FIG. 14, the resistance circuit 3B includes the second inductor L2B and the third inductor L3.

Figure 15:
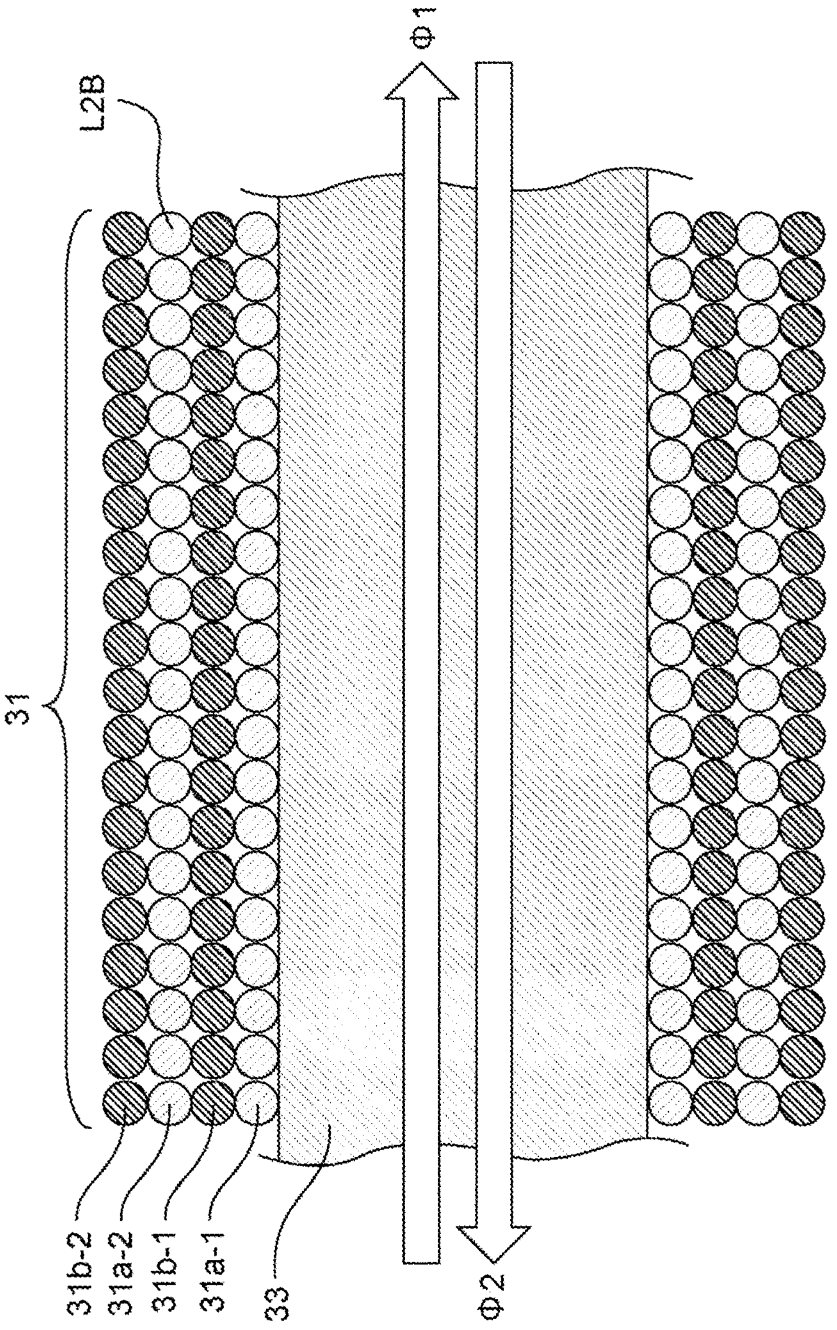
FIG. 15 is a schematic cross-sectional view of a second inductor of the antenna device of FIG. 11.

FIG. 15 illustrates a schematic cross-sectional view of the second inductor L2B of the antenna device 1B. As illustrated in FIG. 15, the second inductor L2B includes the second winding 31 and a second core 33. The second inductor L2B is a cored coil. The cored coil is a coil in which a path of a magnetic flux generated by passing a current through the coil is made of a magnetic material.

As illustrated in FIG. 13 and FIG. 14, the second winding 31 is formed by the conducting wire W2. More specifically, the conducting wire W2 is wound around the second region 41*b* of the pair of side wall portions 41 of the bobbin 4 such that the axial direction of the second winding 31 coincides with the length direction of the pair of side wall portions 41.

A portion of the conducting wire W2 wound around the second region 41*b* forms the second winding 31.

As illustrated in FIG. 15, the second winding 31 has a plurality of sets of first winding portions 31*a*-1 and 31*a*-2 (hereinafter collectively denoted by reference numeral 31*a*) and second winding portions 31*b*-1 and 31*b*-2 (hereinafter collectively denoted by reference numeral 31*b*). Note that in FIG. 15, the second winding 31 has the plurality of sets of the first winding portion 31*a* and the second winding portion 31*b*. However, it is sufficient that the second winding 31 has at least one set of the first winding portion 31*a* and the second winding portion 31*b* according to an alternative aspect.

In the second winding 31 of FIG. 15, the set of the first winding portion 31*a*-1 and the second winding portion 31*b*-1 is located closer to the second core 33 than the set of the first winding portion 31*a*-2 and the second winding portion 31*b*-2. In the set of the first winding portion 31*a*-1 and the second winding portion 31*b*-1, the second winding portion 31*b*-1 is wound around the second core 33 over the first winding portion 31*a*-1. In the set of the first winding portion 31*a*-2 and the second winding portion 31*b*-2, the second winding portion 31*b*-2 is wound around the second core 33 over the first winding portion 31*a*-2. The second winding 31 of FIG. 15 has a so-called even-numbered multilayer winding structure. As a result, the length of the second winding 31 in the axial direction can be shortened and the space required for arranging the second winding 31 can be reduced.

The axial direction of the first winding portion 31*a* and the axial direction of the second winding portion 31*b* coincide with the length direction of the pair of side wall portions 41, that is, the axial direction of the second core 33. Meanwhile, the winding direction of the first winding portion 31*a* and the winding direction of the second winding portion 31*b* are opposite to each other. Thus, as illustrated in FIG. 15, the direction of a magnetic flux Φ1 generated in the first winding portion 31*a* and the direction of a magnetic flux Φ2 generated in the second winding portion 31*b* are opposite to each other. Therefore, in the second winding 31, the combined inductance of the first winding portion 31*a* and the second winding portion 31*b* is small as compared with a case where the winding direction of the first winding portion 31*a* and the winding direction of the second winding portion 31*b* are the same as each other. Thus, the influence of the change in the number of turns of the second winding 31 on the inductance of the second inductor L2B can be reduced.

Figure 16:
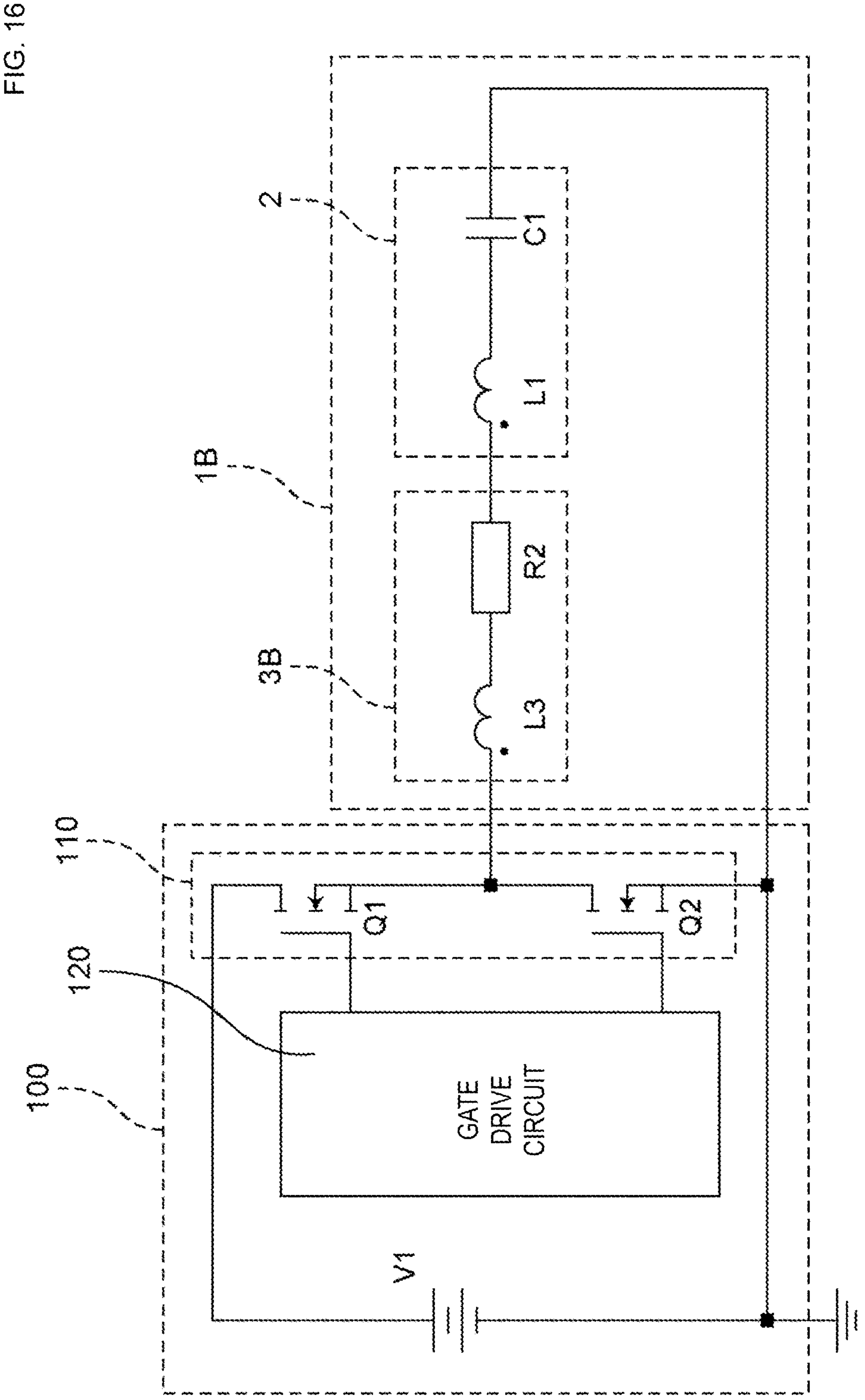
FIG. 16 is an equivalent circuit diagram illustrating a configuration example of a system including the antenna device of FIG. 11.

When the combined inductance of a set of the first winding portion 31*a* and the second winding portion 31*b* is defined as L, the combined inductance is given by $L=La+Lb-2M$. La is the inductance of the first winding portion 31*a* and Lb is the inductance of the second winding portion 31*b*. M is a mutual inductance between the first winding portion 31*a* and the second winding portion 31*b*. M is obtained from $M=k\sqrt{(La \times Lb)}$, and k is a coupling coefficient. In the ideal case of no leakage flux, k=1 is satisfied. Therefore, when La=Lb, then M=0 is satisfied. When the combined inductance M of the first winding portion 31*a* and the second winding portion 31*b* of each set of the second winding 31 is 0, the inductance of the second winding 31 can be set to 0. Here, La=Lb can be satisfied by making the number of turns of the first winding portion 31*a* and the number of turns of the second winding portion 31*b* equal to each other. In other words, when the first winding portion 31*a* and the second winding portion 31*b* have the same number of turns, the inductance of the second inductor L2B is 0, and the second inductor L2B has only resistance components. Therefore, the second inductor L2B is equivalent to a resistor R2 having the same resistance value. FIG. 16 is an equivalent circuit diagram illustrating a configuration example of a system including the antenna device 1B. As illustrated in FIG. 16, the antenna device 1B includes the resistance circuit 3B in which the resistor R2 and the third inductor L3 are connected in series.

According to the exemplary aspect, the second core 33 has a prismatic shape. The second core 33 is made of, for example, ceramics such as ferrite as ceramics have high heat resistance. The second core 33 is accommodated in a space between the pair of side wall portions 41. Thus, the second core 33 is arranged inside the second winding 31. As illustrated in FIG. 13 and FIG. 14, the second core 33 is arranged in the second region 41*b*. In the antenna device 1B, the first core 22 and the second core 33 are formed continuously and integrally. As a result, the number of components of the antenna device 1B can be reduced and the manufacturing cost can also be reduced.

Since the second inductor L2B has the second core 33, heat generated in the second winding 31 can be dissipated by the second core 33 having a thermal conductivity higher than that of air. Therefore, in the antenna device 1B, the temperature rise of the second winding 31 can be reduced. In particular, a local temperature rise of the second winding 31 can be reduced during energization of the second winding 31. As described above, the second core 33 is made of ceramics such as ferrite, for example, as ceramics have high heat resistance. Therefore, the second core 33 can reduce the influence of deterioration due to heat generation in the second winding 31. Further, since the second core 33 is formed continuously and integrally with the first core 22, heat generated in the second winding 31 can be dissipated also by the first core 22. Although the capacitor C1 is present in the vicinity of the first core 22, the capacitor C1 is made of ceramics as described above. Ceramics have high heat resistance. Therefore, the capacitor C1 can reduce the influence of deterioration due to heat generated in the second winding 31.

The third inductor L3 is electrically connected to the second inductor L2. The third inductor L3 includes the third winding 32. The third winding 32 is formed by the conducting wire W2. More specifically, the conducting wire W2 is wound around the winding drum portion 46 of the bobbin 4. A portion of the conducting wire W2 wound around the winding drum portion 46 forms the third winding 32. Since the winding drum portion 46 is a non-magnetic body, the third winding 32 forms an air-core coil.

Since the second winding 31 and the third winding 32 are formed by the same conducting wire W2, they are electrically connected to each other in series. Both ends of the conducting wire W2 are fixed and electrically connected to the third connection terminal 53 and the fifth connection terminal 55, respectively. For example, both ends of the conducting wire W2 are bound and bonded to the third connection terminal 53 and the fifth connection terminal 55, respectively.

In the antenna device 1B, the resistance value of the entire antenna device 1B can be adjusted by adjusting the resistance value of the resistance circuit 3B. The resistance value of the resistance circuit 3B is determined by the resistance value of the second winding 31 of the second inductor L2B and the resistance value of the third winding 32 of the third inductor L3. In the present embodiment, the resistance value of the resistance circuit 3B is the sum of the resistance value of the second winding 31 of the second inductor L2B and the resistance value of the third winding 32 of the third inductor L3. The resistance value of the second winding 31 of the second inductor L2B depends on the conducting wire diameter and the conducting wire length of the second winding 31. The resistance value of the third winding 32 of the third inductor L3 depends on the conducting wire diameter and the conducting wire length of the third winding 32. As such, the conducting wire diameters and the conducting wire lengths of the second winding 31 and the third winding 32 may be set so that the resistance value of the resistance circuit 3B becomes a desired resistance value. Therefore, it is easy to design the resistance value of the resistance circuit 3B and to manage the manufacture. As such, the resistance value of the resistance circuit 3B can be stably set.

In the antenna device 1B, the conducting wire lengths of the second winding 31 and the third winding 32 are proportional to the numbers of turns of the second winding 31 and the third winding 32. Therefore, the resistance value of the resistance circuit 3B can be adjusted by adjusting the number of turns of the second winding 31 of the second inductor L2B and the number of turns of the third winding 32 of the third inductor L3. In the present embodiment, the second winding 31 and the third winding 32 are formed by the same conducting wire W2, but the cross-sectional area of the winding drum portion 46 is smaller than the cross-sectional area of the drum portion of the bobbin 4. As such, the cross-sectional area of the third winding 32 is smaller than the cross-sectional area of the second winding 31. Therefore, a change in inductance due to a change in the number of turns of the third winding 32 can be made smaller than a change in inductance due to a change in the number of turns of the second winding 31. Accordingly, the influence of the change in the inductance of the third inductor L3 can be reduced. In addition, a change in the conducting wire length of the third winding 32 with respect to a change in the number of turns of the third winding 32 can be made smaller than a change in the conducting wire length of the second winding 31 with respect to a change in the number of turns of the second winding 31. Therefore, according to the third winding 32, the resistance value of the resistance circuit 3 can be adjusted more finely than the second winding 31. In the antenna device 1B, the resistance value of the resistance circuit 3 is adjusted mainly by adjusting the number of turns of the second winding 31. The adjustment of the resistance value of the resistance circuit 3 by the number of turns of the third winding 32 is used for fine adjustment of the resistance value of the resistance circuit 3 after the number of turns of the second winding 31 is determined. As described above, since the influence of the change in the inductance of the third inductor L3 can be reduced, the resistance value can be adjusted by the third winding 32 without affecting the second winding 31.

In the antenna device 1B, by changing the numbers of turns of the second winding 31 and the third winding 32, the inductances of the second inductor L2B and the third inductor L3, that is, the inductance of the antenna device 1B can also be changed. The change in the inductance of the antenna device 1B may affect the resonant frequency of the antenna device 1B. However, in the second winding 31, the winding direction of the first winding portion 31*a* and the winding direction of the second winding portion 31*b* are opposite to each other. Therefore, in the second winding 31, the combined inductance of the first winding portion 31*a* and the second winding portion 31*b* is small as compared with a case where the winding direction of the first winding portion 31*a* and the winding direction of the second winding portion 31*b* are the same as each other. Thus, it is possible to reduce the influence of the change in the number of turns of the second winding 31 on the inductance of the second inductor L2B. In addition, since the third winding 32 is an air-core coil, the influence of the change in the number of turns of the third winding 32 on the inductance of the third inductor L3 is smaller than that in the case where the third winding 32 is a cored coil. Therefore, according to the present embodiment, it is possible to easily adjust the resistance value of the antenna device 1B while reducing the influence on the inductance of the antenna device 1B.

3-2. Effects and the Like

As described above, the antenna device 1B includes the antenna circuit 2 having the first inductor L1 and the resistance circuit 3B that has the second inductor L2B and is electrically connected to the antenna circuit 2. The first inductor L1 has the first winding 21 and the first core 22 arranged inside the first winding 21. The second inductor L2B has the second winding 31 and the second core 33 arranged inside the second winding 31. The second winding 31 includes at least one set of the first winding portion 31*a* and the second winding portion 31*b*. The winding direction of the first winding portion 31*a* and the winding direction of the second winding portion 31*b* are opposite to each other. This makes it possible to easily adjust the resistance value of the antenna device 1B while reducing the influence on the inductance of the antenna device 1B. Furthermore, the heat generated by the second winding 31 can be dissipated by the second core 33, and the temperature rise of the second winding 31 can be reduced.

In addition, in the antenna device 1B, the second winding portion 31*b* is wound around the second core 33 over the first winding portion 31*a*. As a result, the length of the second winding 31 in the axial direction can be shortened and the space required for arranging the second winding 31 can be reduced.

In addition, in the antenna device 1B, the first core 22 and the second core 33 are formed continuously and integrally. As a result, the number of components of the antenna device 1B can be reduced and the manufacturing cost can be reduced.

In addition, in the antenna device 1B, similar to the antenna device 1, the resistivity of the second winding 31 is higher than the resistivity of the first winding 21. This makes it possible to shorten the length of the conducting wire required to set the resistance value of the second winding 31 to a desired resistance value as compared with the case where the same conducting wire W1 as that of the first winding 21 is used for the second winding 31.

Further, in the antenna device 1B, similar to the antenna device 1, the number of turns of the second winding 31 is smaller than the number of turns of the first winding 21. Thus, the time required for forming the second winding 31 can be shortened.

In addition, in the antenna device 1B, similar to the antenna device 1, the resistance circuit 3B has the third inductor L3 electrically connected to the second inductor L2B. The third inductor L3 has the third winding 32 that forms an air-core coil. The axial direction of the third winding 32 intersects the axial direction of the second winding 31. Thus, since the resistance value of the antenna device 1B can be adjusted by adjusting the number of turns of the second winding 31 and the number of turns of the third winding 32, fine adjustment of the resistance value of the antenna device 1B becomes possible. In addition, since the direction of the magnetic flux generated by the third winding 32 and the direction of the magnetic flux generated by the second winding 31 intersect each other, it is possible to reduce the influence of the change in the inductance of the third inductor L3.

Further, in the antenna device 1B, similar to the antenna device 1, the cross-sectional area of the third winding 32 is smaller than the cross-sectional area of the second winding 31. As a result, the change in inductance due to the change in the number of turns of the third winding 32 can be made smaller than the change in inductance due to the change in the number of turns of the second winding 31, so that the influence of the change in inductance of the third inductor L3 can be reduced.

In addition, in the antenna device 1B, similar to the antenna device 1, the resistivity of the third winding 32 is higher than the resistivity of the first winding 21. This makes it possible to shorten the length of the conducting wire required to set the resistance value of the third winding 32 to a desired resistance value as compared with the case where the same conducting wire W1 as that of the first winding 21 is used for the third winding 32.

In addition, in the antenna device 1B, similar to the antenna device 1, the antenna circuit 2 has the capacitor C1 electrically connected to the first inductor L1. The first inductor L1 is located on the side opposite to the second inductor L2B with respect to the capacitor C1. Thus, the capacitor C1 can reduce the influence of heat generated in the second inductor L2B on the first inductor L1, and can reduce the temperature variation of the inductance of the first inductor L1.

In addition, in the antenna device 1B, similar to the antenna device 1, the inductance of the second inductor L2B is smaller than the inductance of the first inductor L1. This configuration makes it possible to easily adjust the resistance value of the antenna device 1B while reducing the influence on the inductance of the antenna device 1B.

In addition, similar to the antenna device 1, the antenna device 1B includes the first and second connection terminals 51 and 52 that are electrically connected to the antenna drive circuit 100. A series circuit of the antenna circuit 2 and the resistance circuit 3B is electrically connected between the first and second connection terminals 51 and 52. As a result, the resistance circuit 3B can be arranged away from the antenna drive circuit 100, so that the influence of heat generated in the resistance circuit 3B on the antenna drive circuit 100 can be reduced.

4. Embodiment 4

Figure 17:
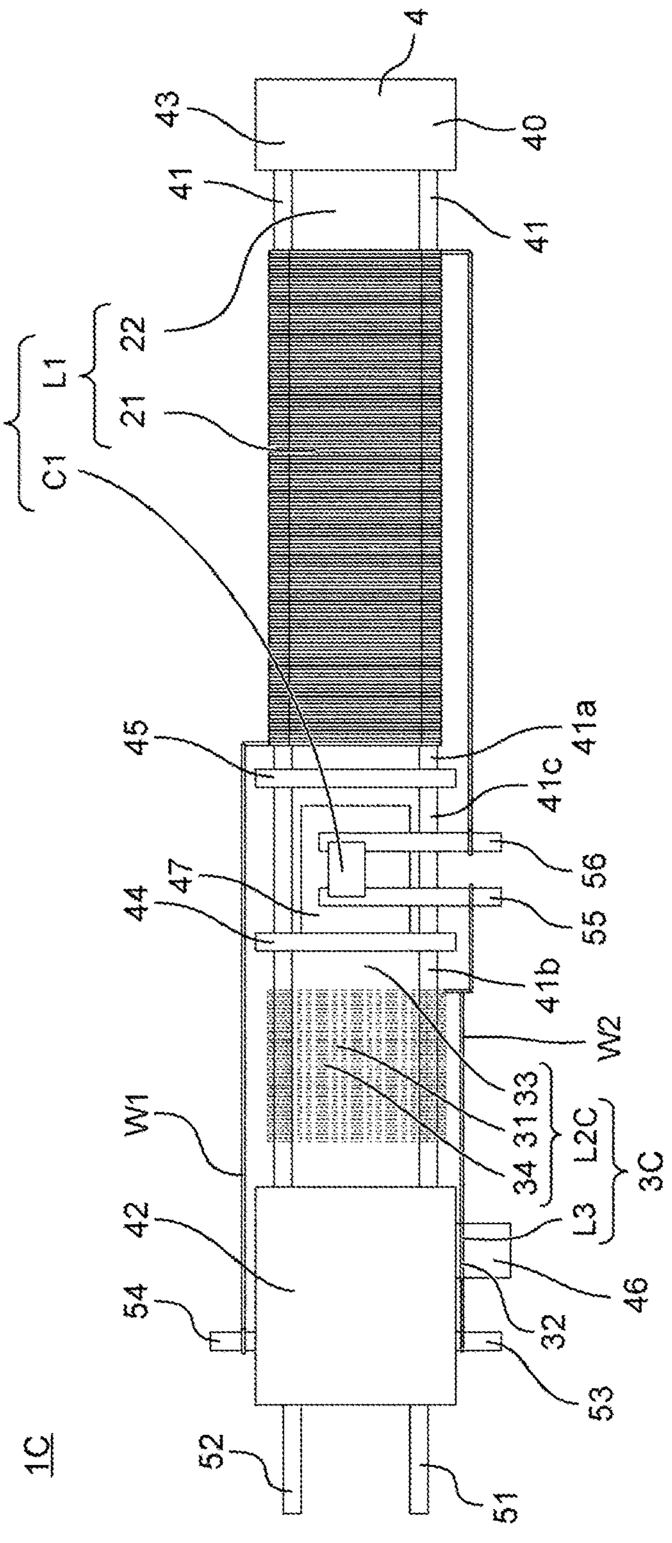
FIG. 17 is a plan view of an antenna device according to exemplary Embodiment 4.
Figure 18:
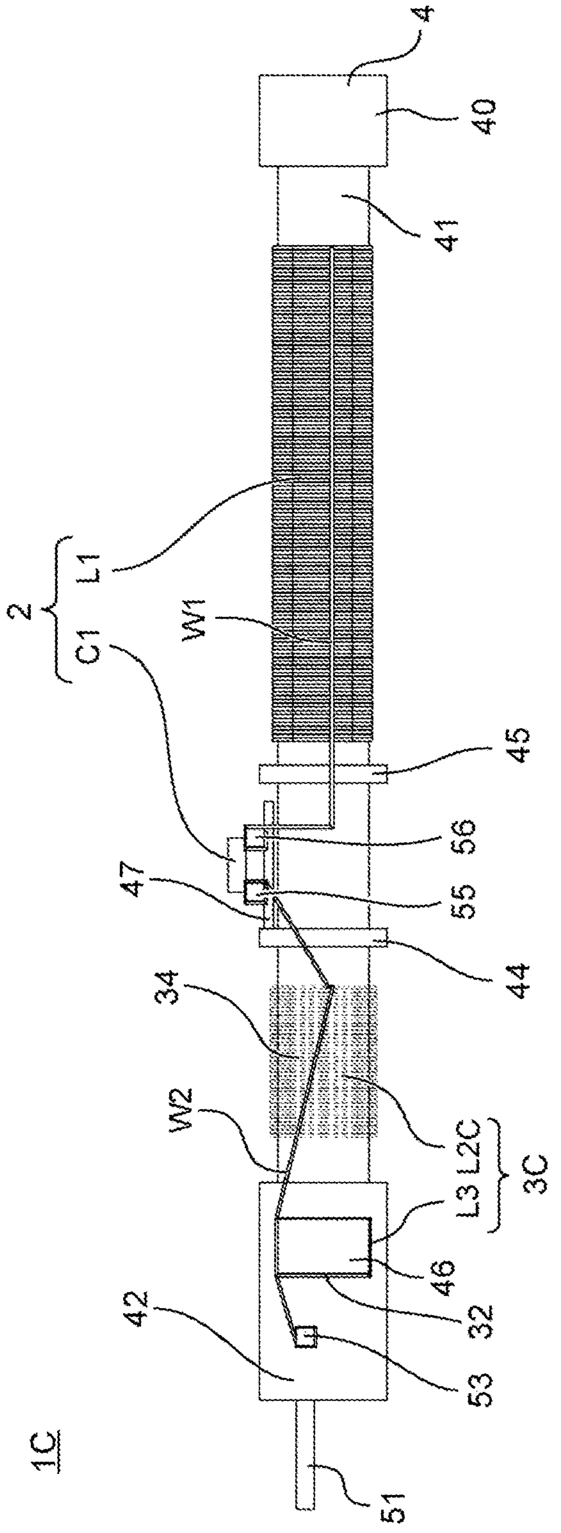
FIG. 18 is a side view of the antenna device of FIG. 17.

FIG. 17 and FIG. 18 illustrate the configuration example of an antenna device 1C. FIG. 17 is a plan view of the antenna device 1C, and FIG. 18 is a side view of the antenna device 1C.

As illustrated in FIG. 17 and FIG. 18, the antenna device 1C includes the antenna circuit 2, a resistance circuit 3C electrically connected to the antenna circuit 2, and the bobbin 4 holding the antenna circuit 2 and the resistance circuit 3C. The antenna device 1C is connected to the antenna drive circuit 100, as in the case of the antenna device 1 illustrated in FIG. 1. That is, the antenna device 1C is connected to the antenna drive circuit 100 so as to be electrically connected in parallel to the switching element Q2 of the switching circuit 110.

As illustrated in FIG. 17 and FIG. 18, the antenna circuit 2 includes the first inductor L1 and the capacitor C1. The first inductor L1 includes the first winding 21 and the first core 22.

As illustrated in FIG. 17 and FIG. 18, the resistance circuit 3C includes a second inductor L2C and the third inductor L3.

Figure 19:
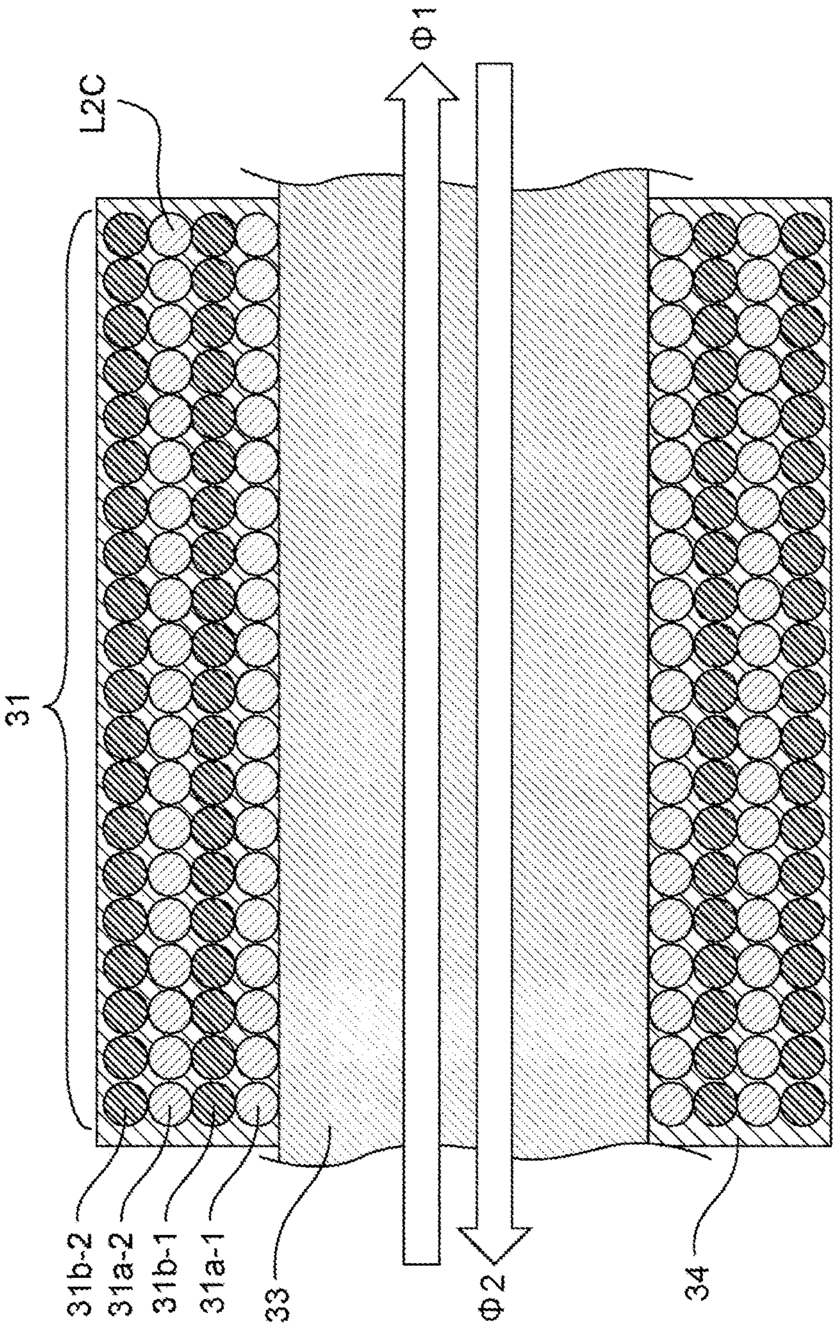
FIG. 19 is a schematic cross-sectional view of a second inductor of the antenna device of FIG. 17.

FIG. 19 illustrates a schematic cross-sectional view of the second inductor L2C of the antenna device 1C. As illustrated in FIG. 19, the second inductor L2C includes the second winding 31, the second core 33, and a thermally conductive material 34. The second inductor L2C is a cored coil.

As illustrated in FIG. 17 and FIG. 18, the second winding 31 is formed by the conducting wire W2. More specifically, the conducting wire W2 is wound around the second region 41*b* of the pair of side wall portions 41 of the bobbin 4 such that the axial direction of the second winding 31 coincides with the length direction of the pair of side wall portions 41. A portion of the conducting wire W2 wound around the second region 41*b* forms the second winding 31.

As illustrated in FIG. 19, the second winding 31 has the plurality of sets of first winding portions 31*a*-1 and 31*a*-2 and second winding portions 31*b*-1 and 31*b*-2. In the set of the first winding portion 31*a* and the second winding portion 31*b*, the second winding portion 31*b* is wound around the second core 33 over the first winding portion 31*a*. The second winding 31 of FIG. 19 has a so-called even-numbered multilayer winding structure. As a result, the length of the second winding 31 in the axial direction can be shortened and the space required for arranging the second winding 31 can be reduced. The axial direction of the first winding portion 31*a* and the axial direction of the second winding portion 31*b* coincide with the length direction of the pair of side wall portions 41, that is, the axial direction of the second core 33. The winding direction of the first winding portion 31*a* and the winding direction of the second winding portion 31*b* are opposite to each other. Thus, as illustrated in FIG. 19, the direction of the magnetic flux Φ1 generated in the first winding portion 31*a* and the direction of the magnetic flux Φ2 generated in the second winding portion 31*b* are opposite to each other. Therefore, in the second winding 31, the combined inductance of the first winding portion 31*a* and the second winding portion 31*b* is small as compared with a case where the winding direction of the first winding portion 31*a* and the winding direction of the second winding portion 31*b* are the same as each other. Thus, the influence of the change in the number of turns of the second winding 31 on the inductance of the second inductor L2C can be reduced.

According to the exemplary aspect, the thermally conductive material 34 is provided so as to fill a space between the second core 33 and the second winding 31. In FIG. 19, the thermally conductive material 34 is provided so as to also fill the space between the turns of the second winding 31. Furthermore, in FIG. 19, the thermally conductive material 34 is provided so as to cover the entire outer surface of the second winding 31. The thermally conductive material 34 is, for example, a silicone-based thermally conductive resin. The thermally conductive material 34 can be obtained, for example, by impregnating a portion that serves as the second winding 31 in the conducting wire W2 with a thermally conductive resin, winding the portion around the second region 41*b*, and curing the thermally conductive resin. In the second inductor L2C, heat generated in the second winding 31 can be efficiently transferred to the second core 33 by the thermally conductive material 34, and the temperature rise of the second winding 31 can be further reduced.

In an exemplary aspect, the thermally conductive material 34 may be provided so as to fill at least the space between the second core 33 and the second winding 31. That is, the thermally conductive material 34 does not necessarily need to cover the outer surface of the second winding 31 and may have a portion interposed between the second core 33 and the second winding 31. The thermally conductive material 34 is a material having thermal conductivity better than that of air.

In the antenna device 1C, the resistance value of the entire antenna device 1C can be adjusted by adjusting the resistance value of the resistance circuit 3C. The resistance value of the resistance circuit 3C can be adjusted by adjusting the number of turns of the second winding 31 of the second inductor L2C and the number of turns of the third winding 32 of the third inductor L3. By changing the numbers of turns of the second winding 31 and the third winding 32, the inductances of the second inductor L2C and the third inductor L3, that is, the inductance of the antenna device 1C is also changed. The change in the inductance of the antenna device 1C may affect the resonant frequency of the antenna device 1C. However, in the second winding 31, the winding direction of the first winding portion 31*a* and the winding direction of the second winding portion 31*b* are opposite to each other. Therefore, in the second winding 31, the combined inductance of the first winding portion 31*a* and the second winding portion 31*b* is small as compared with a case where the winding direction of the first winding portion 31*a* and the winding direction of the second winding portion 31*b* are the same as each other. Thus, it is possible to reduce the influence of the change in the number of turns of the second winding 31 on the inductance of the second inductor L2C. In addition, since the third winding 32 is an air-core coil, the influence of the change in the number of turns of the third winding 32 on the inductance of the third inductor L3 is smaller than that in the case where the third winding 32 is a cored coil. Therefore, according to the present embodiment, the resistance value of the antenna device 1C can be easily adjusted while reducing the influence on the inductance of the antenna device 1C.

Furthermore, in the antenna device 1C, the second inductor L2C has the thermally conductive material 34 that fills the space between the second core 33 and the second winding 31. Thus, the heat generated in the second winding 31 can be efficiently transferred to the second core 33, and the temperature rise of the second winding 31 can be further reduced.

5. Embodiment 5

Figure 20:
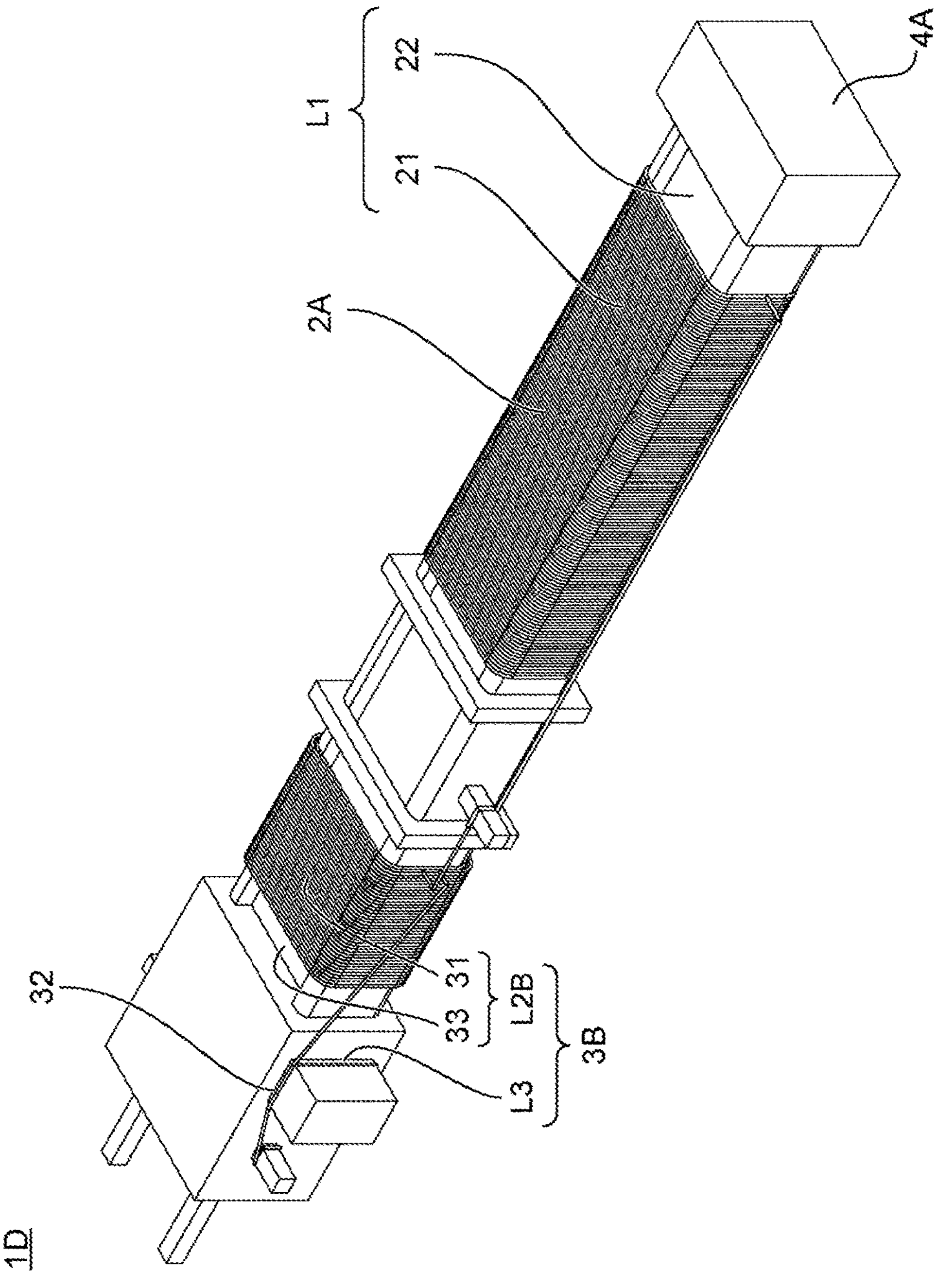
FIG. 20 is a perspective view of a configuration example of an antenna device according to exemplary Embodiment 5.
Figure 21:
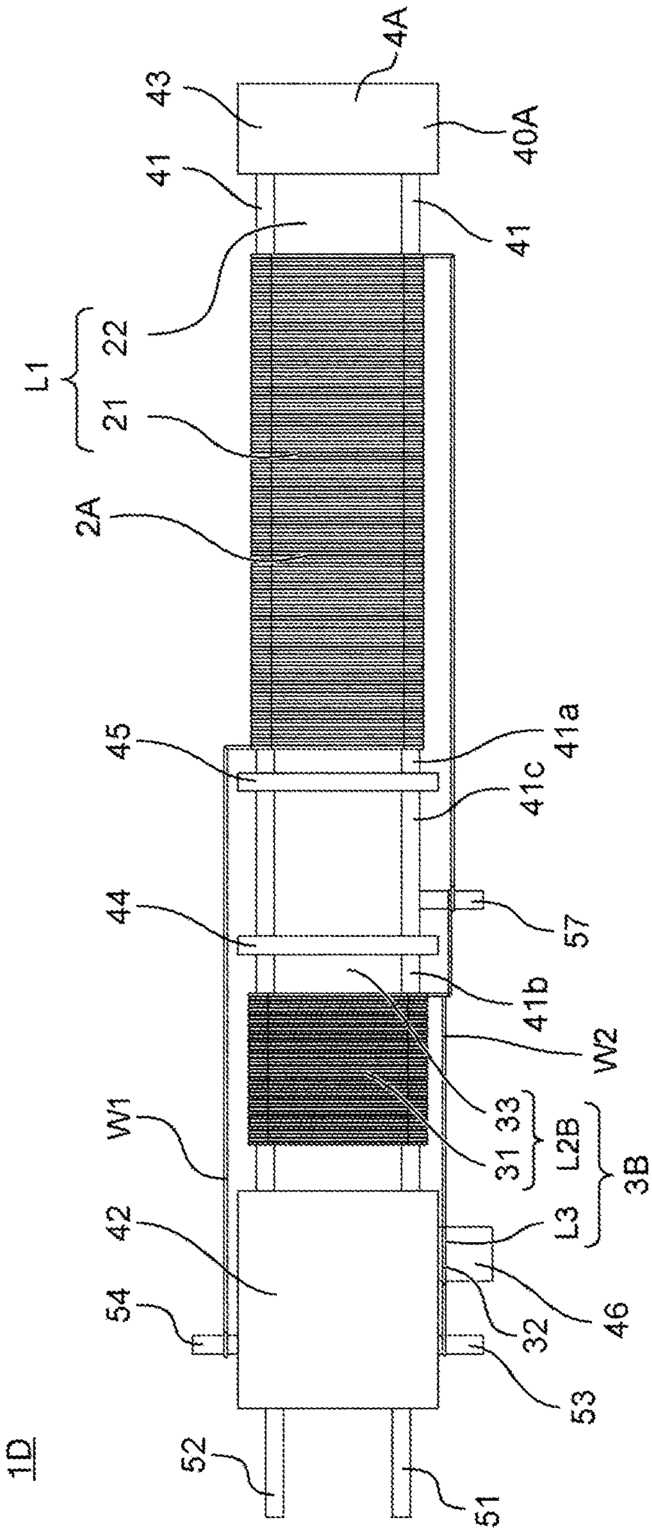
FIG. 21 is a plan view of the antenna device of FIG. 20.
Figure 22:
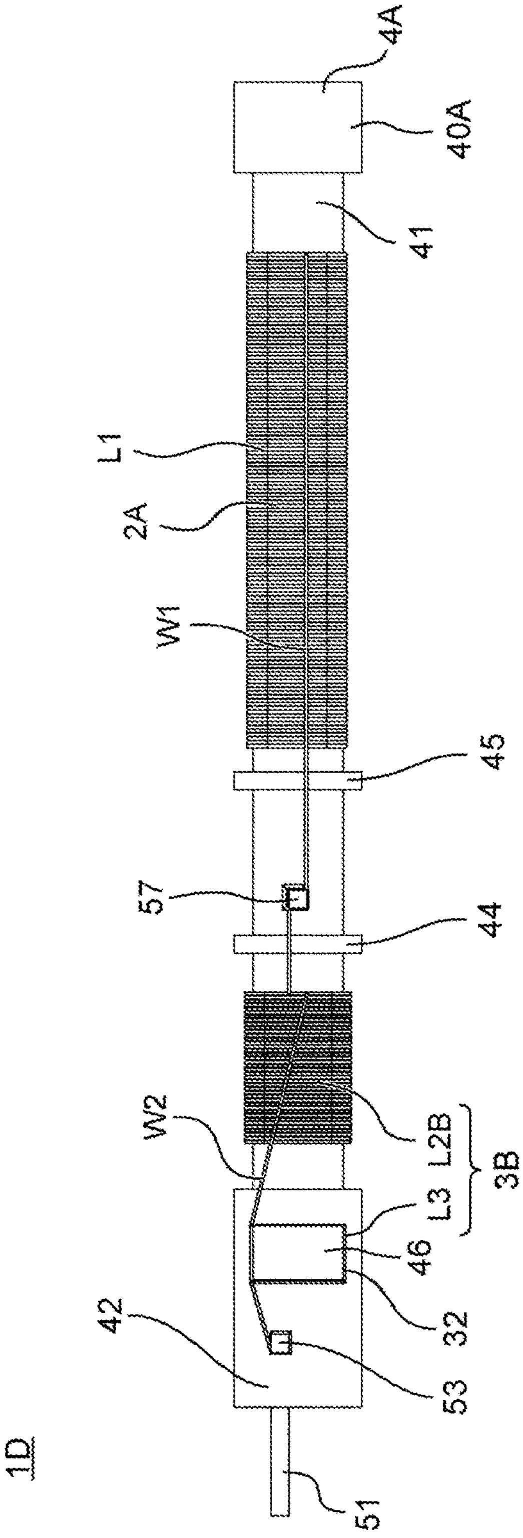
FIG. 22 is a side view of the antenna device of FIG. 20.

FIG. 20 to FIG. 22 illustrate the configuration example of an antenna device 1D according to the present embodiment. FIG. 20 is a perspective view of the antenna device 1D. FIG. 21 is a plan view of the antenna device 1D, and FIG. 22 is a side view of the antenna device 1D.

As illustrated in FIG. 21 and FIG. 22, the antenna device 1D includes the antenna circuit 2A, the resistance circuit 3B electrically connected to the antenna circuit 2A, and the bobbin 4A that holds the antenna circuit 2A and the resistance circuit 3B. The antenna device 1D is connected to the antenna drive circuit 100, as in the case of the antenna device 1 illustrated in FIG. 1. That is, the antenna device 1D is connected to the antenna drive circuit 100 so as to be electrically connected in parallel to the switching element Q2 of the switching circuit 110.

Like the antenna device 1B illustrated in FIG. 11 to FIG. 14, the antenna device 1D described above includes the resistance circuit 3B. Therefore, it is possible to easily adjust the resistance value of the antenna device 1D while reducing the influence on the inductance of the antenna device 1D. Furthermore, the heat generated by the second winding 31 can be dissipated by the second core 33, and the temperature rise of the second winding 31 can be reduced.

(Modifications)

It is noted that exemplary embodiments of the present disclosure are not limited to the above-described embodiments. The above-described embodiments can be modified in various ways depending on design or the like as long as the objectives of the present disclosure are achieved. Modifications of the above-described embodiments will be listed below. The modifications described below can be applied in appropriate combination.

Figure 23:
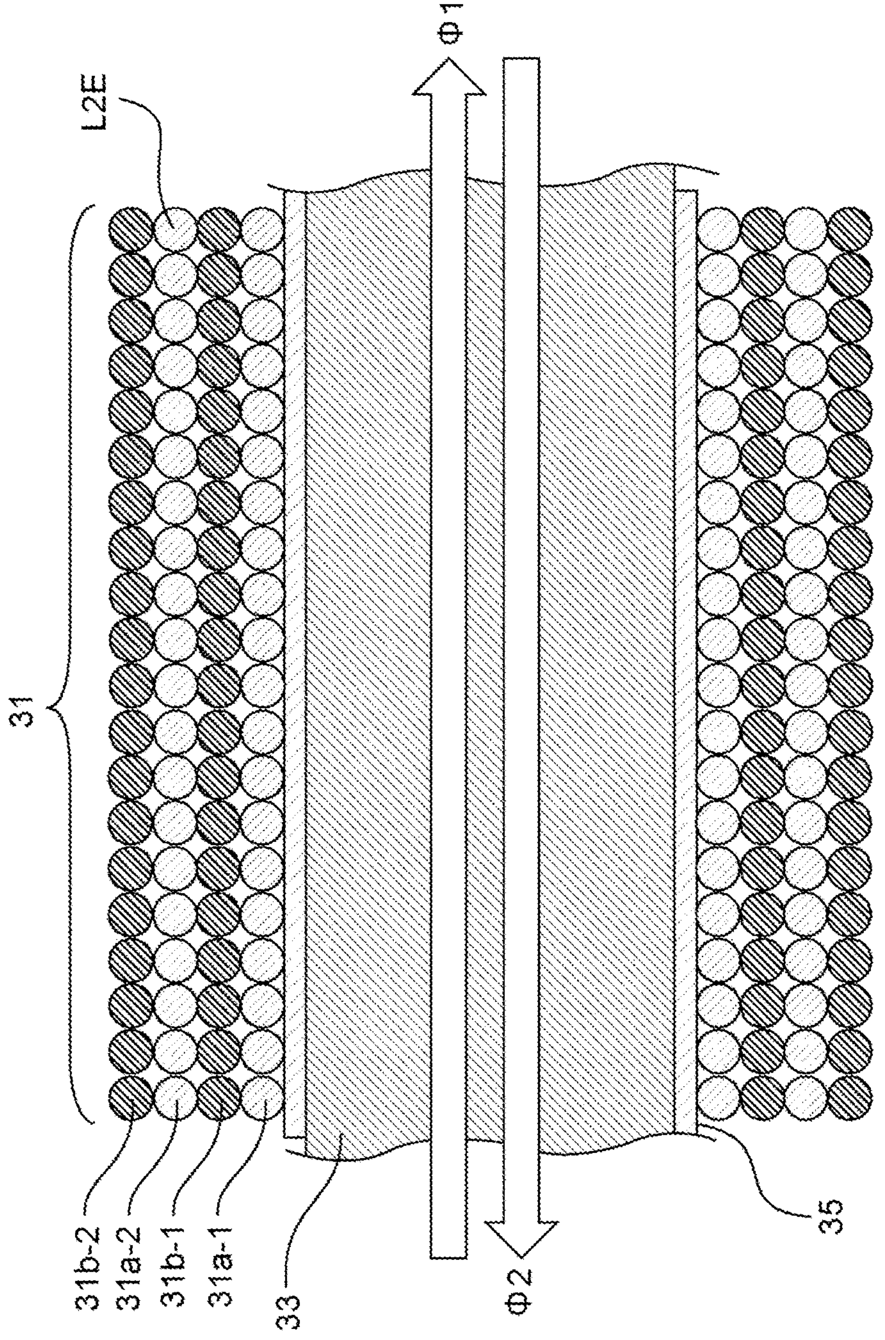
FIG. 23 is a schematic cross-sectional view of a second inductor of an antenna device of a modification.

FIG. 23 is a schematic cross-sectional view of a second inductor L2E of an antenna device of a modification. As illustrated in FIG. 23, the second inductor L2E includes the second winding 31, the second core 33, and a thermal conductive sheet 35. The second inductor L2E is a cored coil.

As illustrated in FIG. 23, the second winding 31 has the plurality of sets of first winding portions 31*a*-1 and 31*a*-2 and second winding portions 31*b*-1 and 31*b*-2. In the set of the first winding portion 31*a* and the second winding portion 31*b*, the second winding portion 31*b* is wound around the second core 33 over the first winding portion 31*a*. The winding direction of the first winding portion 31*a* and the winding direction of the second winding portion 31*b* are opposite to each other. Thus, as illustrated in FIG. 23, the direction of the magnetic flux Φ1 generated in the first winding portion 31*a* and the direction of the magnetic flux Φ2 generated in the second winding portion 31*b* are opposite to each other.

The thermal conductive sheet 35 is located between the second core 33 and the second winding 31. Since the second core 33 is arranged between the pair of side wall portions 41, the thermal conductive sheets 35 are respectively arranged on the surfaces (e.g., the upper surface and the lower surface in FIG. 23) of the second core 33 exposed between the pair of side wall portions 41. The thermal conductive sheet 35 is, for example, a silicone-based thermal conductive sheet. In the second inductor L2E, heat generated in the second winding 31 can be efficiently transferred to the second core 33 by the thermal conductive sheet 35, and the temperature rise of the second winding 31 can be further reduced.

As described above, the second inductor L2E has the thermal conductive sheet 35 between the second core 33 and the second winding 31. Thus, the heat generated in the second winding 31 can be efficiently transferred to the second core 33, and the temperature rise of the second winding 31 can be further reduced.

Figure 24:
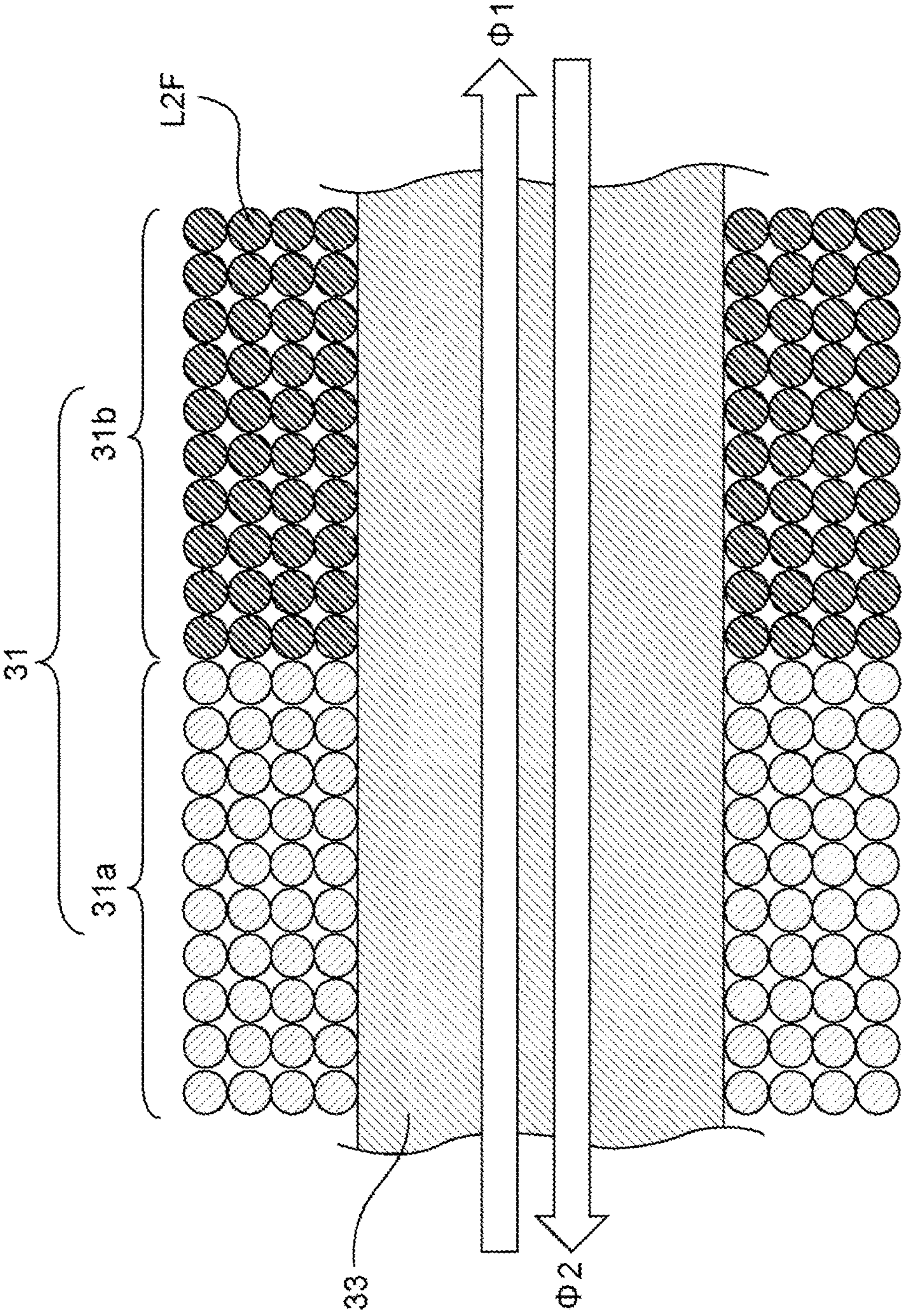
FIG. 24 is a schematic cross-sectional view of a second inductor of an antenna device according to another modification.

FIG. 24 is a schematic cross-sectional view of a second inductor L2F of an antenna device of a modification. As illustrated in FIG. 24, the second inductor L2F includes the second winding 31 and the second core 33. The second inductor L2F is a cored coil. Note that the second inductor L2F may include the thermally conductive material 34 illustrated in FIG. 19 or the thermal conductive sheet 35 illustrated in FIG. 23.

As illustrated in FIG. 24, the second winding 31 has a set of the first winding portion 31*a* and the second winding portion 31*b*. The axial direction of the first winding portion 31*a* and the axial direction of the second winding portion 31*b* coincide with the length direction of the pair of side wall portions 41, that is, the axial direction of the second core 33. The winding direction of the first winding portion 31*a* and the winding direction of the second winding portion 31*b* are opposite to each other. Thus, as illustrated in FIG. 24, the direction of the magnetic flux Φ1 generated in the first winding portion 31*a* and the direction of the magnetic flux Φ2 generated in the second winding portion 31*b* are opposite to each other. Therefore, in the second winding 31, the combined inductance of the first winding portion 31*a* and the second winding portion 31*b* is small as compared to when the winding direction of the first winding portion 31*a* and the winding direction of the second winding portion 31*b* are the same as each other. Thus, the influence of the change in the number of turns of the second winding 31 on the inductance of the second inductor L2C can be reduced.

In FIG. 24, the second winding portion 31*b* is not wound around the second core 33 over the first winding portion 31*a*. The first winding portion 31*a* and the second winding portion 31*b* are aligned in the axial direction of the second core 33. In this case, the distance between the first winding portion 31*a* and the second core 33 is equal to the distance between the second winding portion 31*b* and the second core 33. Therefore, heat generated in each of the first winding portion 31*a* and the second winding portion 31*b* can be efficiently dissipated by the second core 33.

As described above, in the second inductor L2F illustrated in FIG. 24, the first winding portion 31*a* and the second winding portion 31*b* are aligned in the axial direction of the second core 33. Thus, the heat dissipation property of the second winding 31 can be improved, and the temperature rise of the second winding 31 can be further reduced. Note that in FIG. 24, the second winding 31 has a set of the first winding portion 31*a* and the second winding portion 31*b*. However, the second winding 31 may include a plurality of sets of the first winding portion 31*a* and the second winding portion 31*b*. In each set of the first winding portion 31*a* and the second winding portion 31*b*, the first winding portion 31*a* and the second winding portion 31*b* may be aligned in the axial direction of the second core 33.

In Embodiments 1, 3, and 4, the antenna circuit 2 is a series resonant circuit including the first inductor L1 and the capacitor C1, but is not limited thereto. The antenna circuit 2 may be, for example, a parallel resonant circuit. In this case, the capacitor C1 is electrically connected in parallel to the first inductor L1, for example. When the antenna circuit 2 is a parallel resonant circuit, the resistance circuit 3 may be electrically connected to the antenna circuit 2 not in series but in parallel. In addition, the antenna circuit 2 may have a structure of an existing known antenna circuit, and may include other circuit elements in addition to the first inductor L1 and the capacitor C1. It should be appreciated that how the resistance circuit 3 is connected to the antenna circuit 2 is appropriately determined depending on the circuit configuration of the antenna circuit 2. Moreover, the first inductor L1 is not limited to a solenoid, but may be a part of a transformer. In Embodiments 2 and 5, the antenna circuit 2 may include other circuit elements in addition to the first inductor L1.

In a modification, the resistivity of the second winding 31 need not be greater than the resistivity of the first winding 21. The number of turns of the second winding 31 may be smaller than the number of turns of the first winding 21. In Embodiment 1, the inductances of the second inductors L2, L2B, L2C, L2E, and L2F may be smaller than the inductance of the first inductor L1.

In each of the second inductors L2B, L2C, L2E, and L2F, the number of turns of the first winding portion 31*a* is preferably equal to the number of turns of the second winding portion 31*b*. However, when the winding direction of the first winding portion 31*a* and the winding direction of the second winding portion 31*b* are opposite to each other, it is possible to reduce the inductance of the second winding 31 more than the case where the winding direction of the first winding portion 31*a* and the winding direction of the second winding portion 31*b* are the same. Therefore, the number of turns of the first winding portion 31*a* and the number of turns of the second winding portion 31*b* need not necessarily be equal.

In Embodiments 3 to 5, the second core 33 is not necessarily be formed continuously and integrally with the first core 22.

In Embodiments 1 to 5, the axial direction of the first winding 21 and the axial direction of the second winding 31 may be orthogonal to each other. That is, the winding axis of the first winding 21 and the winding axis of the second winding 31 may be orthogonal to each other. Thus, since the direction of the magnetic flux generated by the second winding 31 and the direction of the magnetic flux generated by the first winding 21 intersect each other, it is possible to reduce the influence of the change in the inductance of the second inductor L2.

In a modification, the third inductor L3 may be a cored coil, and in this case, the third winding 32 may include at least one set of winding portions having winding directions different from each other. The axial direction of the third winding 32 may be parallel to the axial direction of the second winding 31. The cross-sectional area of the third winding 32 may be equal to or larger than the cross-sectional area of the second winding 31. The resistivity of the third winding 32 may be equal to or lower than the resistivity of the first winding 21. The resistivity of the third winding 32 may be different from the resistivity of the second winding 31. The third inductor L3 may be connected not in series but in parallel with the second inductor L2. The third inductor L3 may be omitted.

In one modification, the first inductor L1 need not be located on the side opposite to the second inductors L2, L2B, L2C, L2E, and L2F with respect to the capacitor C1.

In a modification, the bobbins 4 and 4A do not necessarily need to have an elongated shape, but may have an L shape or a flat plate shape, and may be appropriately changed in accordance with the use or the like of the antenna devices 1 and 1A to 1D.

Exemplary Aspects

As is apparent from the above-described embodiments and modifications, the present disclosure includes the following aspects. In the following description, reference numerals are added in parentheses only to clearly illustrate correspondence with the embodiments.

A first aspect, which is an antenna device (1; 1A), includes an antenna circuit (2; 2A) having a first inductor (L1), and a resistance circuit (3) that has a second inductor (L2) and is electrically connected to the antenna circuit (2; 2A). The first inductor (L1) has a first winding (21) and a core (22) arranged inside the first winding (21). The second inductor (L2) has a second winding (31) forming an air-core coil. According to this aspect, the resistance value of the antenna device (1; 1A) can be easily adjusted while reducing the influence on the inductance of the antenna device (1; 1A).

A second aspect, which is an antenna device (1B to 1D), includes the antenna circuit (2; 2A) having the first inductor (L1), and a resistance circuit (3B; 3C) that has a second inductor (L2B; L2C; L2E; L2F) and is electrically connected to the antenna circuit (2; 2A). The first inductor (L1) has the first winding (21) and the first core (22) arranged inside the first winding (21). The second inductor (L2B; L2C; L2E; L2F) has the second winding (31) and a second core (33)

arranged inside the second winding (31). The second winding (31) has at least one set of a first winding portion (31*a*) and a second winding portion (31*b*). A winding direction of the first winding portion (31*a*) and a winding direction of the second winding portion (31*b*) are opposite to each other. According to this aspect, the resistance value of the antenna device (1B to 1D) can be easily adjusted while reducing the influence on the inductance of the antenna device (1B to 1D). Furthermore, the heat generated in the second winding (31) can be dissipated by the second core (33), and the temperature rise of the second winding (31) can be reduced.

A third aspect is the antenna device (1B to 1D) based on the second aspect. In the third aspect, the second winding portion (31*b*) is wound around the second core (33) over the first winding portion (31*a*). According to this aspect, the length of the second winding (31) in the axial direction can be shortened, and the space required for arranging the second winding (31) can be reduced.

A fourth aspect is the antenna device (1B to 1D) based on the second aspect. In the fourth aspect, the first winding portion (31*a*) and the second winding portion (31*b*) are aligned in the axial direction of the second core (33). According to this aspect, the heat dissipation property of the second winding (31) can be improved, and the temperature rise of the second winding (31) can be further reduced.

A fifth aspect is the antenna device (1C) based on any one of the second to fourth aspects. In the fifth aspect, the second inductor (L2C) has a thermally conductive material (34) filling a space between the second core (33) and the second winding (31). According to this aspect, heat generated in the second winding (31) can be efficiently transferred to the second core (33), and the temperature rise of the second winding (31) can be further reduced.

A sixth aspect is the antenna device based on any one of the second to fourth aspects. In the sixth aspect, the second inductor (L2E) has a thermal conductive sheet (35) placed between the second core (33) and the second winding (31). According to this aspect, heat generated in the second winding (31) can be efficiently transferred to the second core (33), and the temperature rise of the second winding (31) can be further reduced.

A seventh aspect is the antenna device (1B to 1D) based on any one of the second to sixth aspects. In the seventh aspect, the first core (22) and the second core (33) are formed continuously and integrally. According to this aspect, it is possible to reduce the number of components of the antenna device (1B to 1D) and to reduce the manufacturing cost.

An eighth aspect is the antenna device (1; 1A to 1D) based on any one of the first to seventh aspects. In the eighth aspect, the resistivity of the second winding (31) is greater than the resistivity of the first winding (21). According to this aspect, the length of the conducting wire required to set the resistance value of the second winding (31) to a desired resistance value can be shortened as compared with the case where the same conducting wire (W1) as that of the first winding (21) is used for the second winding (31).

A ninth aspect is the antenna device (1; 1A to 1D) based on any one of the first to eighth aspects. In the ninth aspect, the number of turns of the second winding (31) is smaller than the number of turns of the first winding (21). According to this aspect, the time required for forming the second winding (31) can be shortened.

A tenth aspect is the antenna device based on any one of the first to ninth aspects. An axial direction of the first winding (21) and an axial direction of the second winding (31) are orthogonal to each other. According to this aspect, since the direction of the magnetic flux generated by the second winding (31) and the direction of the magnetic flux generated by the first winding (21) intersect with each other, the influence of the change in inductance of the second inductor (L2) can be reduced.

An eleventh aspect is the antenna device (1; 1A to 1D) based on any one of the first to tenth aspects. In the eleventh aspect, the resistance circuit (3; 3B; 3C) has a third inductor (L3) electrically connected to the second inductor (L2; L2B; L2C; L2E; L2F). The third inductor (L3) has a third winding (32) forming an air-core coil. The axial direction of the third winding (32) intersects the axial direction of the first winding (21). According to this aspect, since the resistance value of the antenna device (1; 1A to 1D) can be adjusted by adjusting the number of turns of the second winding (31) and the number of turns of the third winding (32), it is possible to finely adjust the resistance value of the antenna device (1; 1A to 1D). In addition, since the direction of the magnetic flux generated by the third winding (32) and the direction of the magnetic flux generated by the first winding (21) intersect each other, the influence of the change in the inductance of the third inductor (L3) can be reduced.

A twelfth aspect is the antenna device (1; 1A to 1D) based on the eleventh aspect. In the twelfth aspect, a cross-sectional area of the third winding (32) is smaller than a cross-sectional area of the second winding (31). According to this aspect, the change in inductance due to the change in the number of turns of the third winding (32) can be made smaller than the change in inductance due to the change in the number of turns of the second winding (31), the influence of the change in inductance of the third inductor (L3) can be reduced.

A thirteenth aspect is the antenna device (1; 1A to 1D) based on the eleventh or twelfth aspect. In the thirteenth aspect, the resistivity of the third winding (32) is greater than the resistivity of the first winding (21). According to this aspect, it is possible to shorten the length of the conducting wire required to set the resistance value of the third winding (32) to a desired resistance value as compared with the case where the same conducting wire (W1) as that of the first winding (21) is used for the third winding (32).

A fourteenth aspect is the antenna device (1; 1B; 1C) based on any one of the first to thirteenth aspects. In the fourteenth aspect, the antenna circuit (2) has a capacitor (C1) electrically connected to the first inductor (L1). The first inductor (L1) is located on the side opposite to the second inductor (L2; L2B; L2C; L2E; L2F) with respect to the capacitor (C1). According to this aspect, by the capacitor (C1), it is possible to reduce the influence of heat generated in the second inductor (L2; L2B; L2C; L2E; L2F) on the first inductor (L1), and it is possible to reduce the temperature variation of the inductance of the first inductor (L1).

A fifteenth aspect is the antenna device (1; 1A to 1D) based on any one of the first to fourteenth aspects. In a fifteenth aspect, the inductance of the second inductor (L2; L2B; L2C; L2E; L2F) is less than the inductance of the first inductor (L1). According to this aspect, it is possible to easily adjust the resistance value of the antenna device (1; 1A to 1D) while reducing the influence on the inductance of the antenna device (1; 1A to 1D).

A sixteenth aspect is the antenna device (1; 1A to 1D) based on any one of the first to fifteenth aspects. In the sixteenth aspect, the antenna device (1; 1A to 1D) includes first and second connection terminals (51, 52) electrically connected to an antenna drive circuit (100). The antenna circuit (2; 2A) and the resistance circuit (3; 3B; 3C) are electrically connected between the first and second connection terminals (51, 52). According to this aspect, since the resistance circuit (3; 3B; 3C) can be arranged away from the antenna drive circuit (100), it is possible to reduce the influence of heat generated in the resistance circuit (3; 3B; 3C) on the antenna drive circuit (100).

As described above, the embodiments have been described as examples of the technique according to the present disclosure. For this reason, the accompanying drawings and detailed description have been provided. In addition, since the above-described embodiments are intended to exemplify the technique in the present disclosure, various changes, replacements, additions, omissions, and the like can be made within the scope of the claims and the scope equivalent thereto.

REFERENCE SIGNS LIST

1, 1A, 1B, 1C, 1D ANTENNA DEVICE
2, 2A ANTENNA CIRCUIT
L1 FIRST INDUCTOR
C1 CAPACITOR
21 FIRST WINDING
22 FIRST CORE (CORE)
3, 3B, 3C RESISTANCE CIRCUIT
L2, L2B, L2C, L2E, L2F SECOND INDUCTOR
L3 THIRD INDUCTOR
31 SECOND WINDING
31*a* FIRST WINDING PORTION
31*b* SECOND WINDING PORTION
32 THIRD WINDING
33 SECOND CORE
34 THERMALLY CONDUCTIVE MATERIAL
35 THERMAL CONDUCTIVE SHEET
51 FIRST CONNECTION TERMINAL
52 SECOND CONNECTION TERMINAL
100 ANTENNA DRIVE CIRCUIT

The invention claimed is:

1. An antenna device comprising:
an antenna circuit having a first inductor that includes a first winding and a core inside the first winding; and
a resistance circuit having a second inductor and that is electrically connected to the antenna circuit,
wherein the second inductor has a second winding that forms an air-core coil, and
wherein the second winding includes a first winding portion and a second winding portion that are aligned in an axial direction of the air-core coil,
wherein the antenna circuit has a capacitor electrically connected to the first inductor, and
wherein the first inductor is located on a side opposite to the second inductor with respect to the capacitor.

2. The antenna device according to claim 1, wherein the second winding has a resistivity that is greater than a resistivity of the first winding.

3. The antenna device according to claim 1, wherein the second winding has a number of turns that is less than a number of turns of the first winding.

4. The antenna device according to claim 1, wherein the second inductor has an inductance that is smaller than an inductance of the first inductor.

5. The antenna device according to claim 1, further comprising:
first and second connection terminals electrically connected to an antenna drive circuit,
wherein the antenna circuit and the resistance circuit are electrically connected between the first and second connection terminals.

6. The antenna device according to claim 1, wherein the air-core coil comprises the second winding wound with a space therebetween.

7. An antenna device comprising:
an antenna circuit having a first inductor that includes a first winding and a core inside the first winding; and
a resistance circuit having a second inductor and that is electrically connected to the antenna circuit and a third inductor electrically connected to the second inductor,
wherein the second inductor has a second winding that forms an air-core coil,
wherein the second winding includes a first winding portion and a second winding portion that are aligned in an axial direction of the air-core coil,
wherein the third inductor has a third winding that forms an air-core coil, and
wherein an axial direction of the third winding intersects an axial direction of the first winding.

8. The antenna device according to claim 7, wherein the third winding has a cross-sectional area that is smaller than a cross-sectional area of the second winding.

9. The antenna device according to claim 7, wherein the third winding has a resistivity that is greater than a resistivity of the first winding.

10. The antenna device according to claim 7, wherein the antenna circuit has a capacitor electrically connected to the first inductor.

11. The antenna device according to claim 10, wherein the first inductor is located on a side opposite to the second inductor with respect to the capacitor.

12. An antenna device comprising:
an antenna circuit having a first inductor with a first winding and a first core inside the first winding; and
a resistance circuit having a second inductor that is electrically connected to the antenna circuit and has a second winding and a second core inside the second winding,
wherein the second winding has a set of a first winding portion and a set of a second winding portion,
wherein a winding direction of the first winding portion is opposite to a winding direction of the second winding portion,
wherein the first winding portion and the second winding portion are aligned in an axial direction of the second core, and
wherein the antenna circuit has a capacitor electrically connected to the first inductor, and the first inductor is located on a side opposite to the second inductor with respect to the capacitor.

13. The antenna device according to claim 12, wherein the second winding portion is wound around the second core over the first winding portion.

14. The antenna device according to claim 12, wherein the second inductor has a thermally conductive material that fills a space between the second core and the second winding.

15. The antenna device according to claim 12, wherein the second inductor has a thermal conductive sheet between the second core and the second winding.

16. The antenna device according to claim 12, wherein the first core and the second core are configured continuously and integrally.

17. The antenna device according to claim 12, wherein the second winding has a resistivity that is greater than a resistivity of the first winding.

18. The antenna device according to claim 12, wherein the second winding has a number of turns that is less than a number of turns of the first winding.

* * * * *